(12) United States Patent
Obata

(10) Patent No.: US 6,172,700 B1
(45) Date of Patent: Jan. 9, 2001

(54) WRITING DEVICE FOR AN IMAGE FORMING APPARATUS

(75) Inventor: Masahito Obata, Chiba (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/007,517

(22) Filed: Jan. 15, 1998

(30) Foreign Application Priority Data

Jan. 16, 1997 (JP) .................................................. 9-005304
May 14, 1997 (JP) .................................................. 9-123864

(51) Int. Cl.[7] ......................................................... B41J 2/47
(52) U.S. Cl. ............................................. 347/237; 347/131
(58) Field of Search ............................. 347/237, 41, 236, 347/238, 240, 297, 251, 130, 131

(56) References Cited

U.S. PATENT DOCUMENTS

| 5,264,868 | * | 11/1993 | Hadley et al. | 347/237 |
|---|---|---|---|---|
| 5,502,478 | * | 3/1996 | Mimura | 347/237 |
| 5,586,055 | * | 12/1996 | Ng et al. | 347/236 |
| 5,623,300 | * | 4/1997 | Itoh et al. | 347/237 |
| 5,767,979 | * | 6/1998 | Kim | 347/237 |
| 5,828,400 | * | 10/1998 | Fleming | 347/237 |
| 5,946,022 | * | 8/1999 | Kamimmura | 347/237 |

OTHER PUBLICATIONS

U.S. application No. 09/007,517, filed Jan. 15, 1998, pending.
U.S. application No. 09/395,726, filed Sep. 9, 1999, pending.

* cited by examiner

*Primary Examiner*—N. Le
*Assistant Examiner*—Lamson D. Nguyen
(74) *Attorney, Agent, or Firm*—Oblon, Spivak, McClelland, Maier & Neustadt, P.C.

(57) ABSTRACT

A writing devices for an image forming apparatus of the present invention determines whether or not an image at and around an interval between nearby light emitter chips of a light emitter array is of halftone. If the image is of halftone, the writing device corrects image data corresponding to the above interval in order to increase the quantity of light. This successfully reduces or fully obviates the local omission of an image ascribable to intervals between nearby light emitter chips and insures a smooth output image.

9 Claims, 26 Drawing Sheets

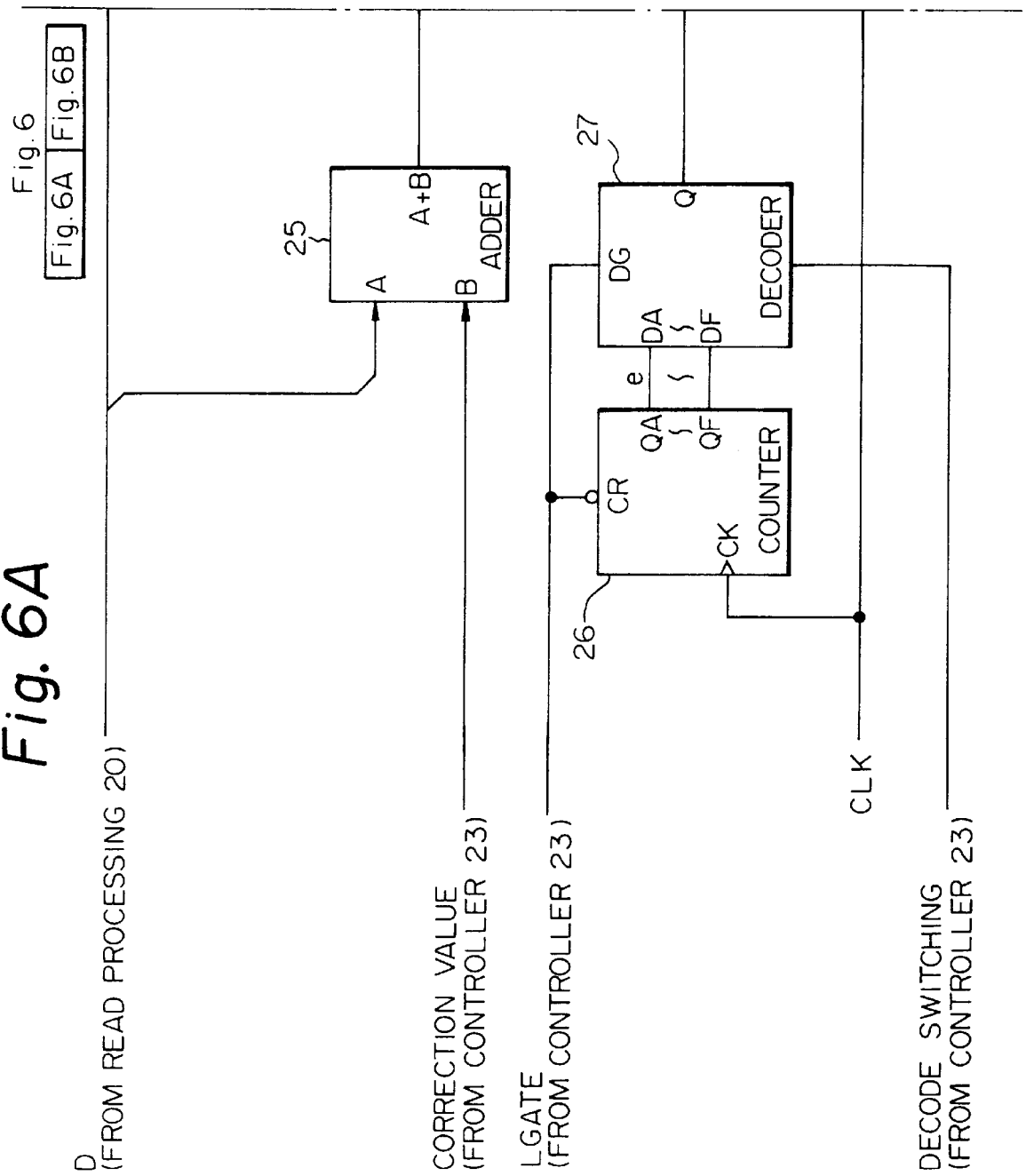

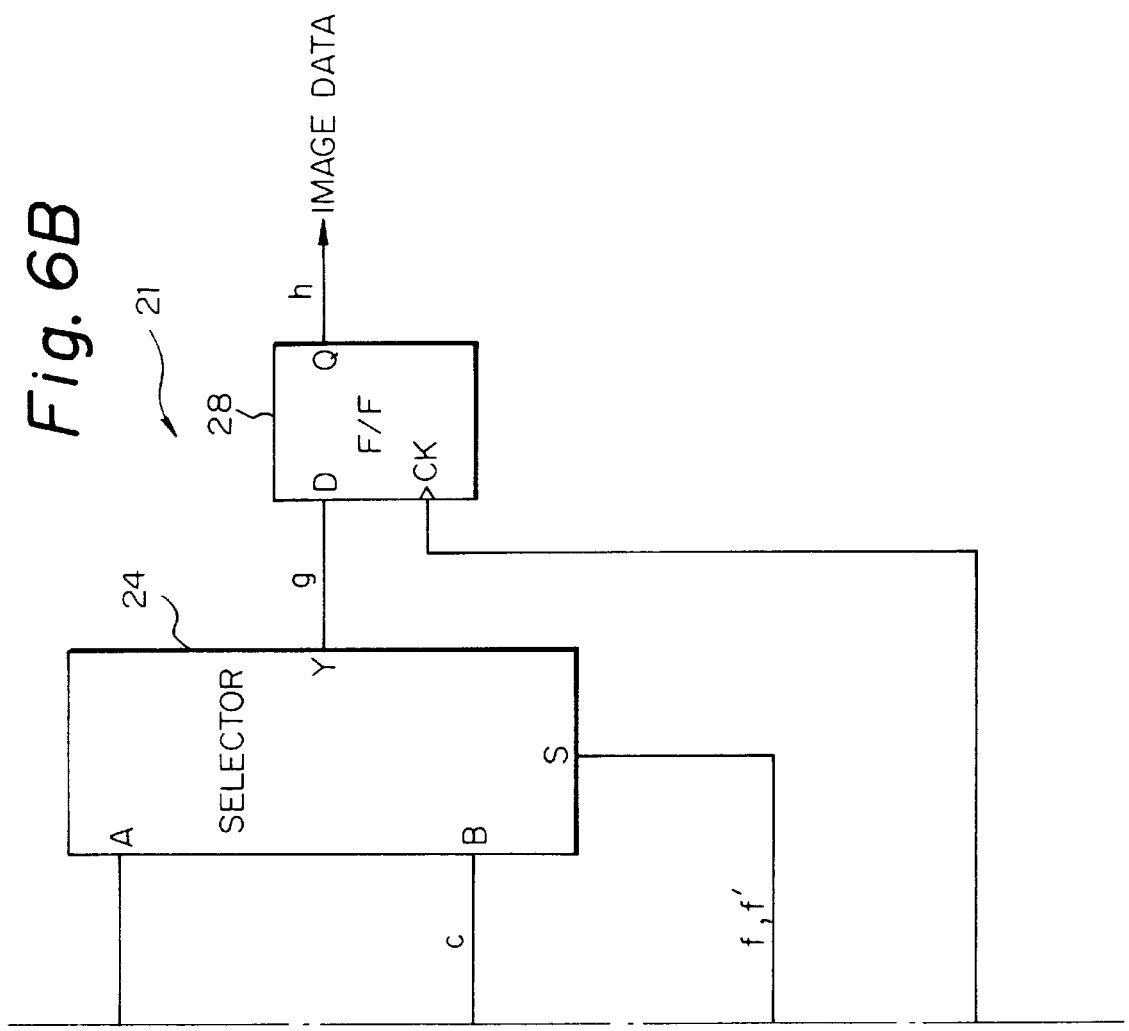

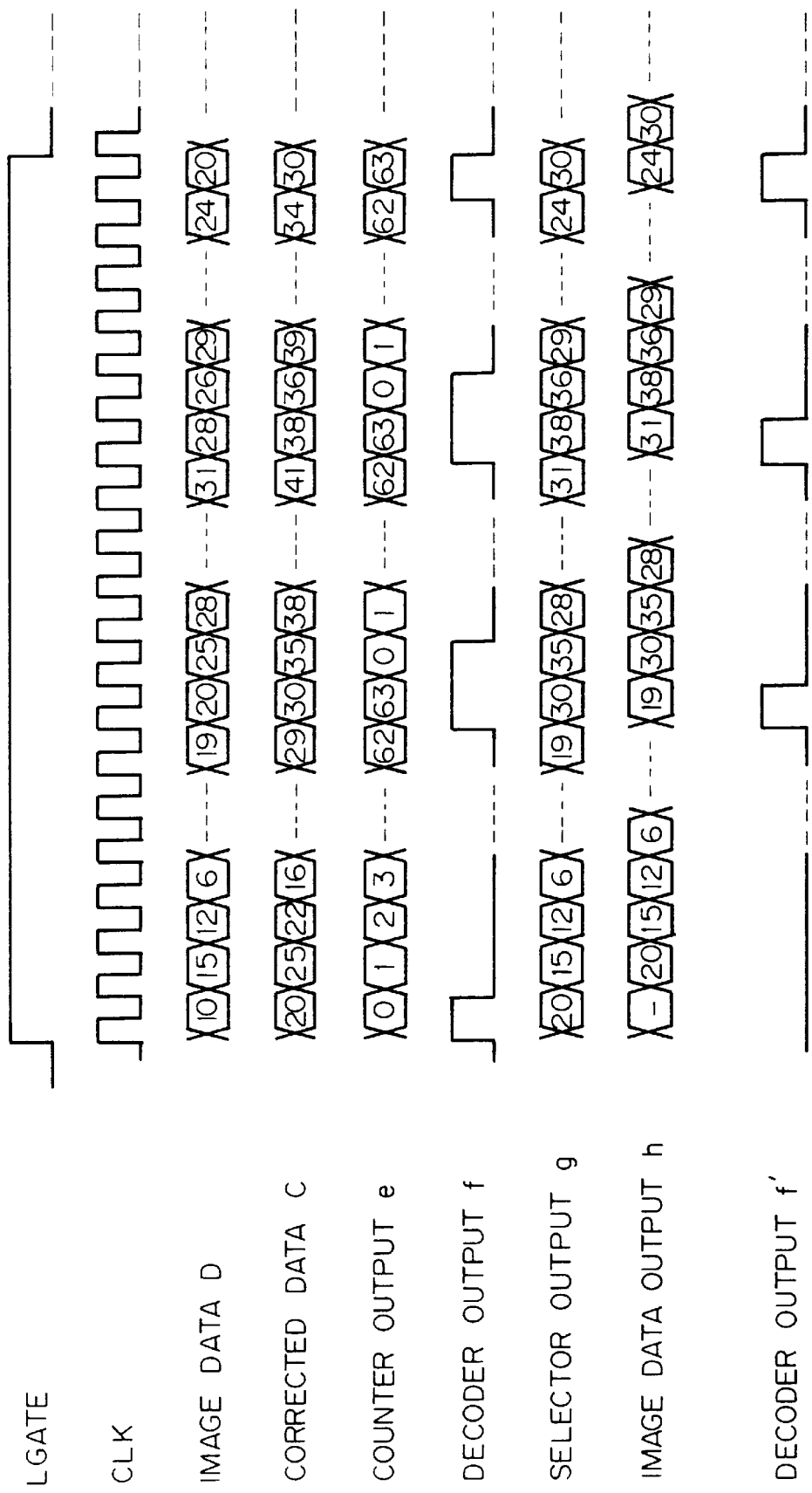

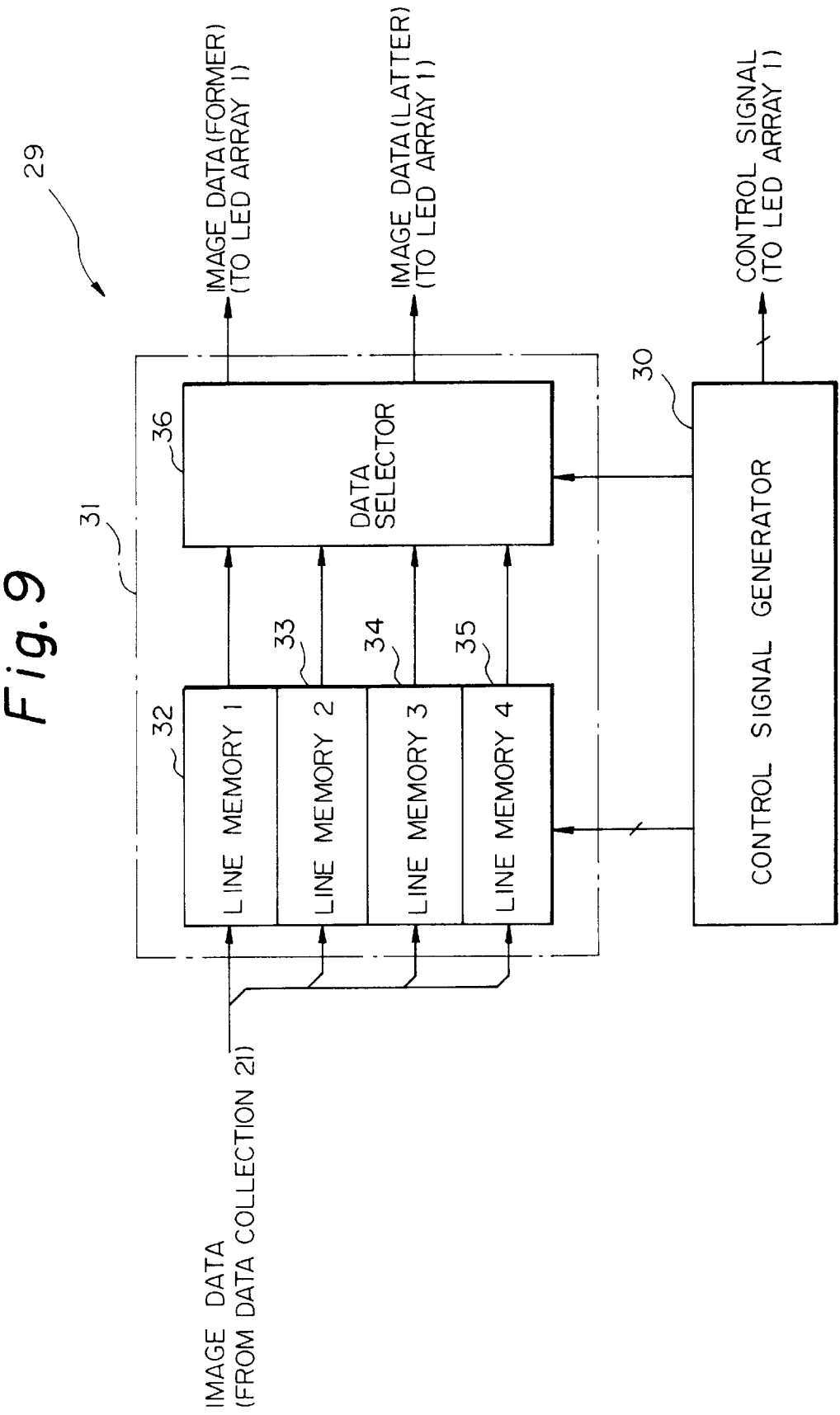

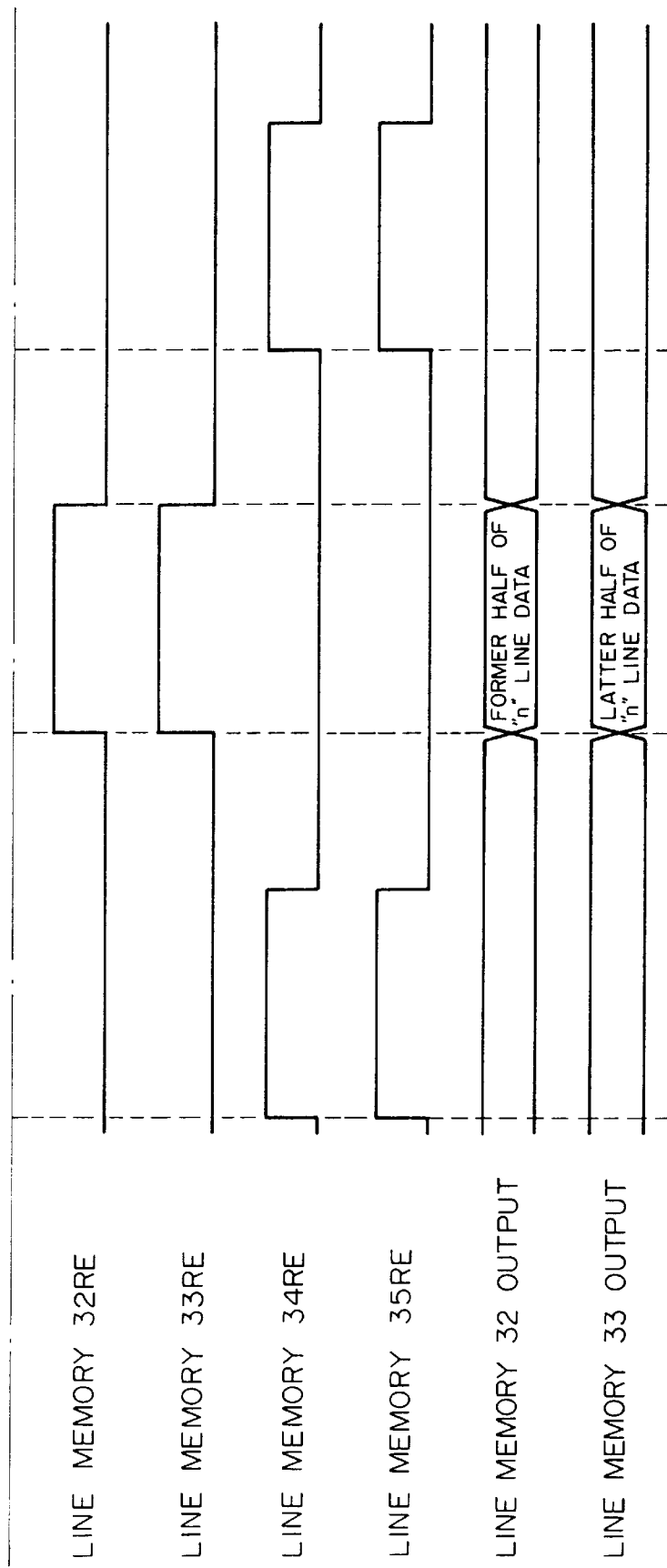

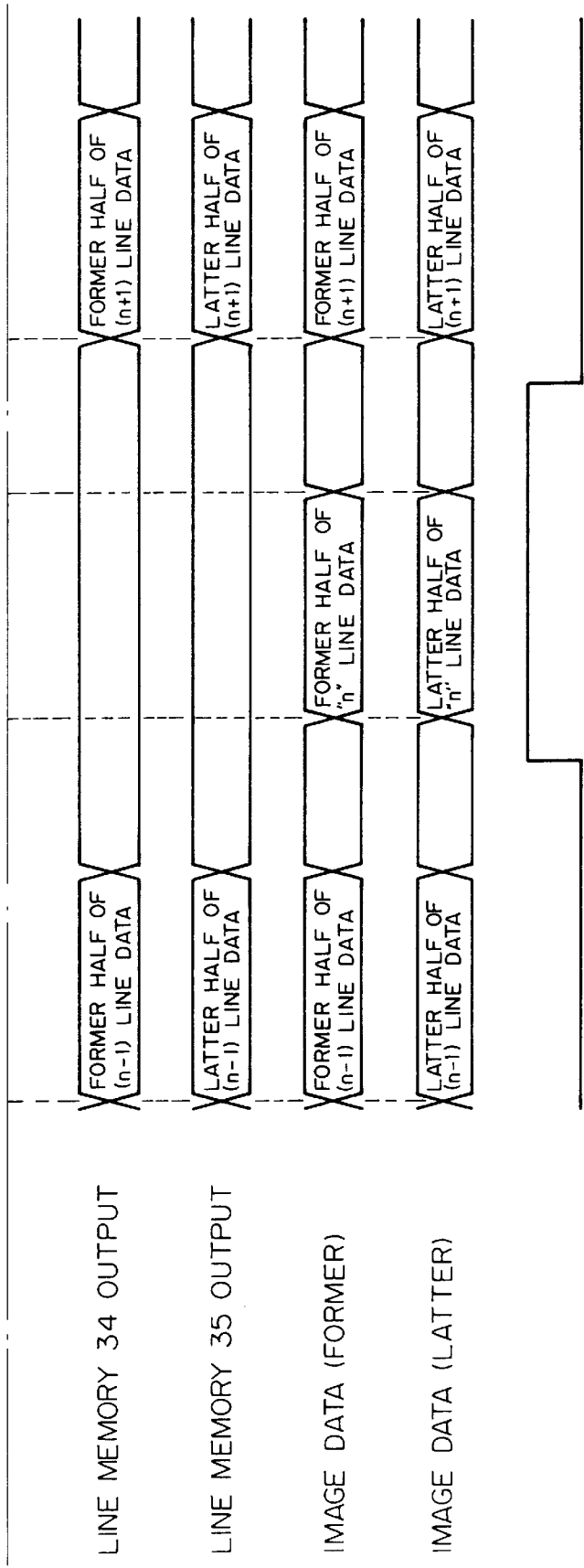

Fig. 14A PRIOR ART
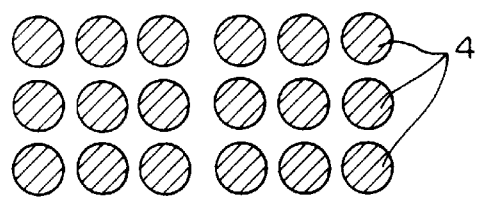
Fig. 14B INVENTION
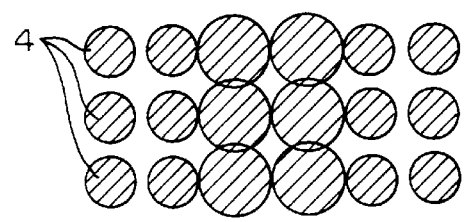
Fig. 15
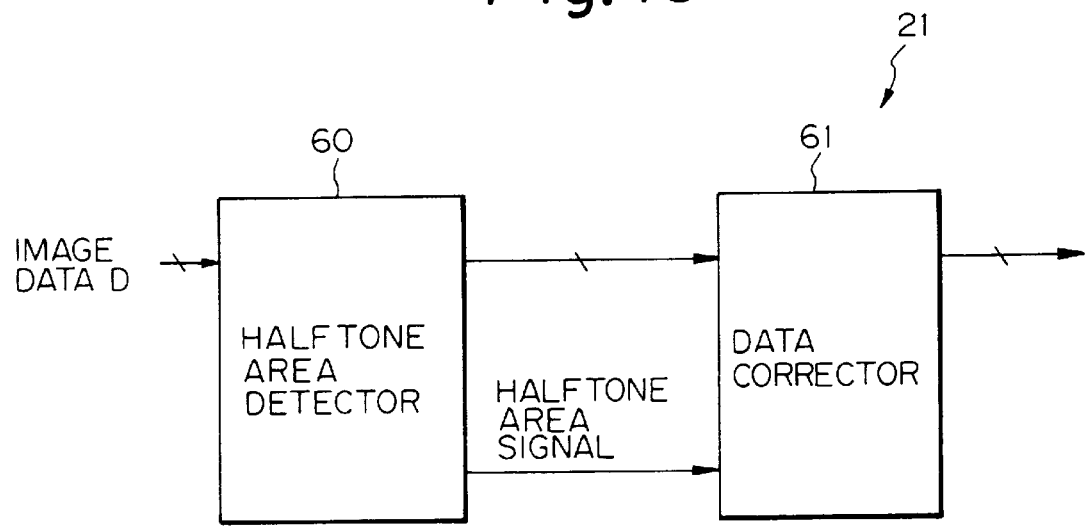

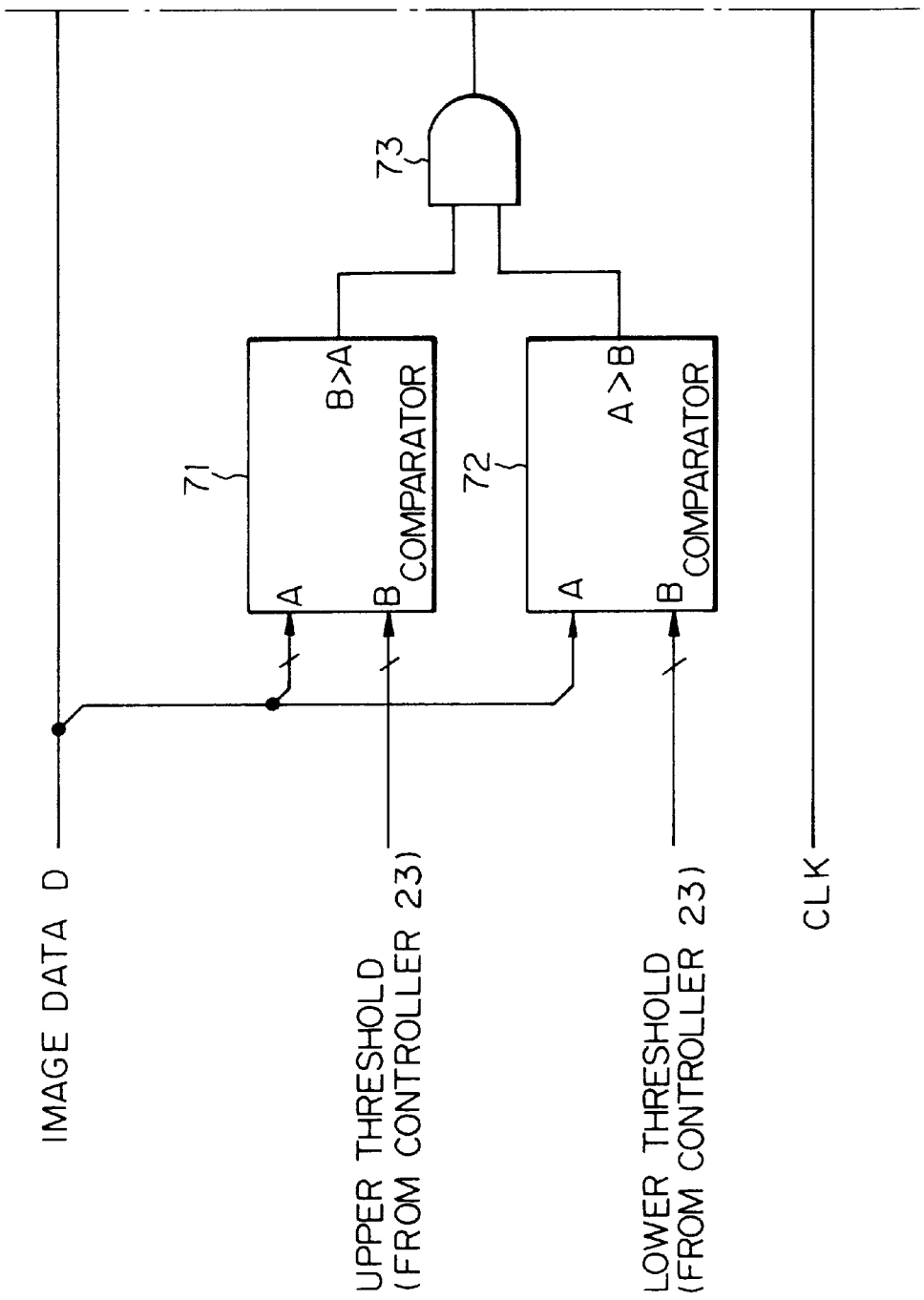

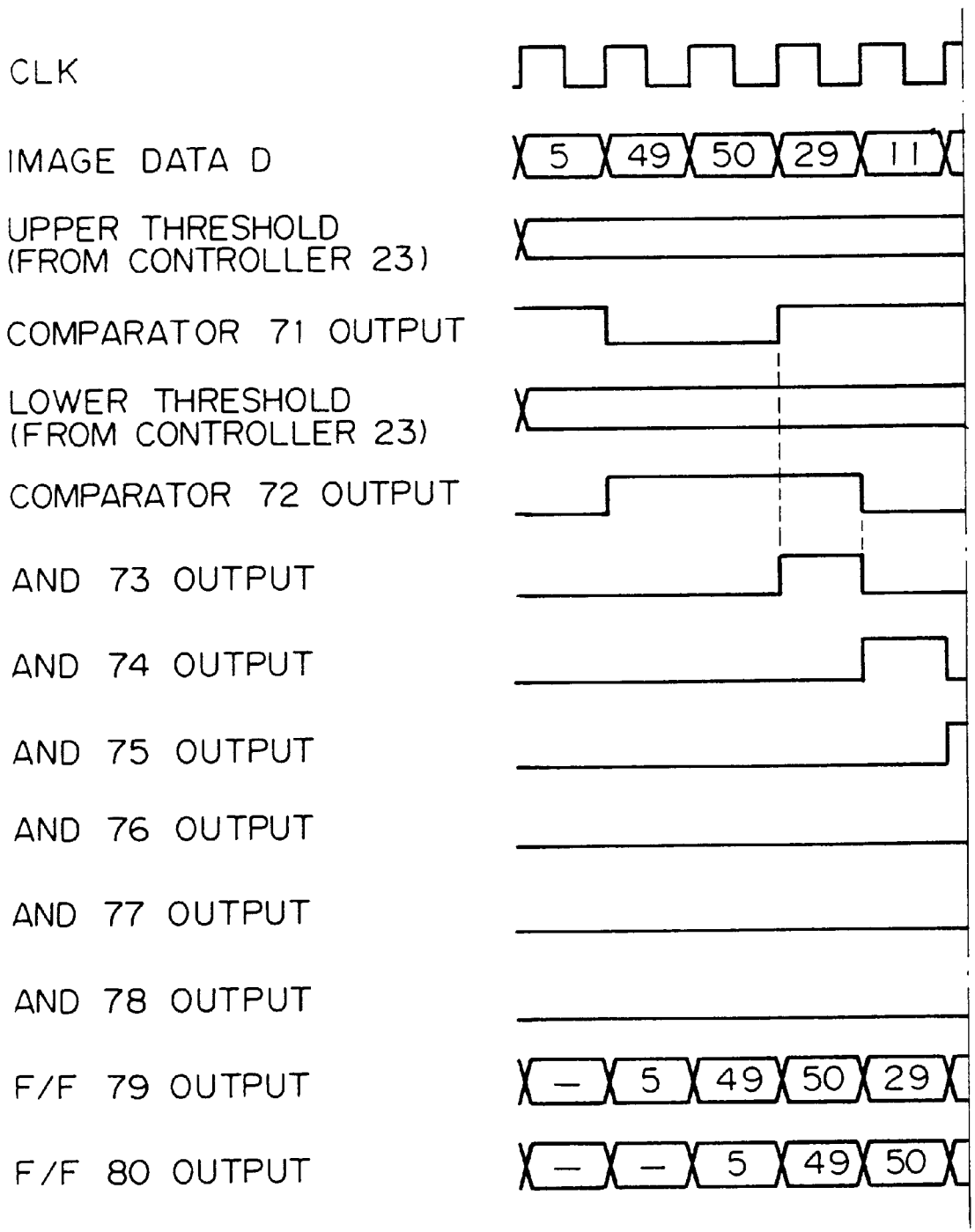

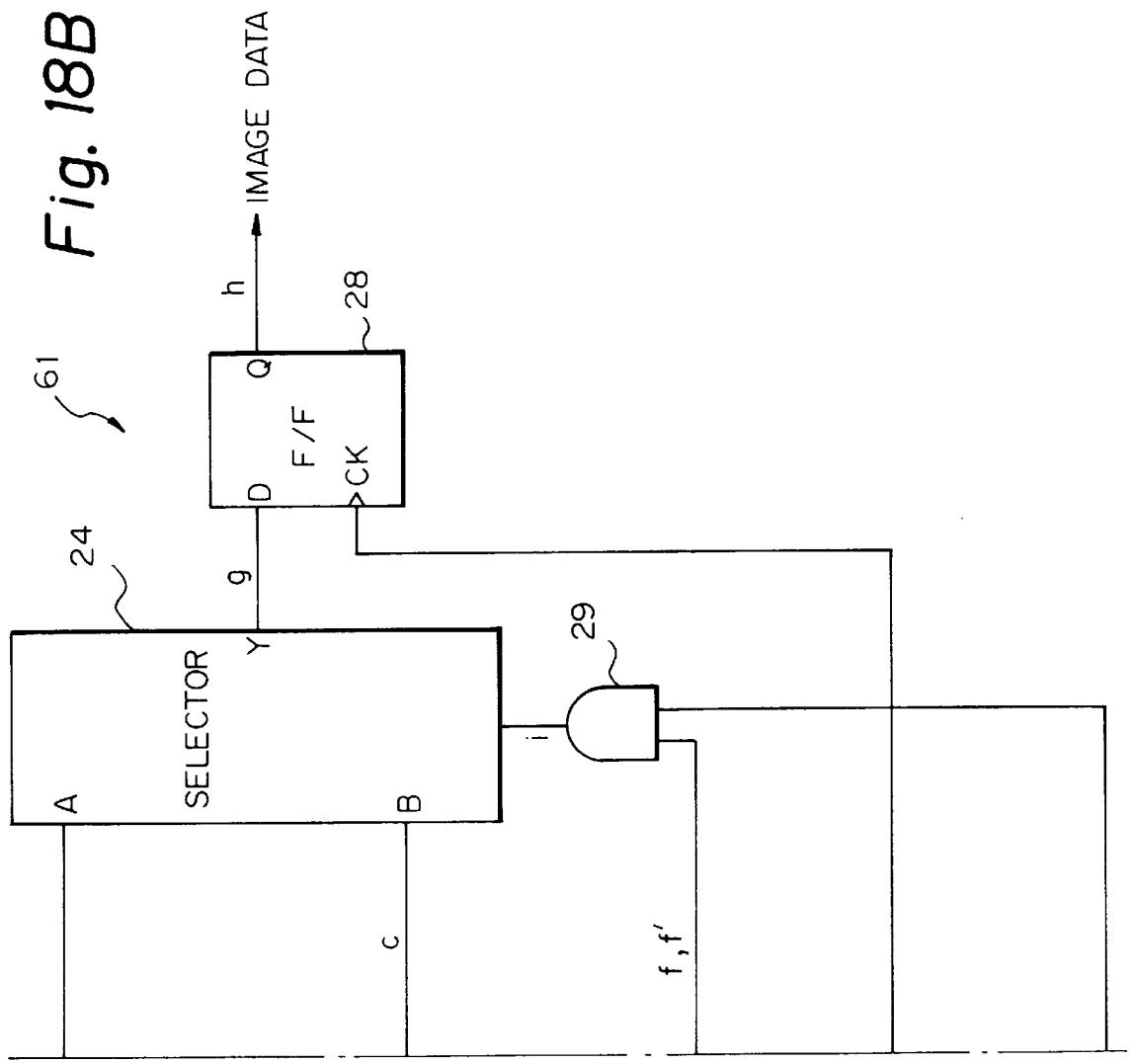

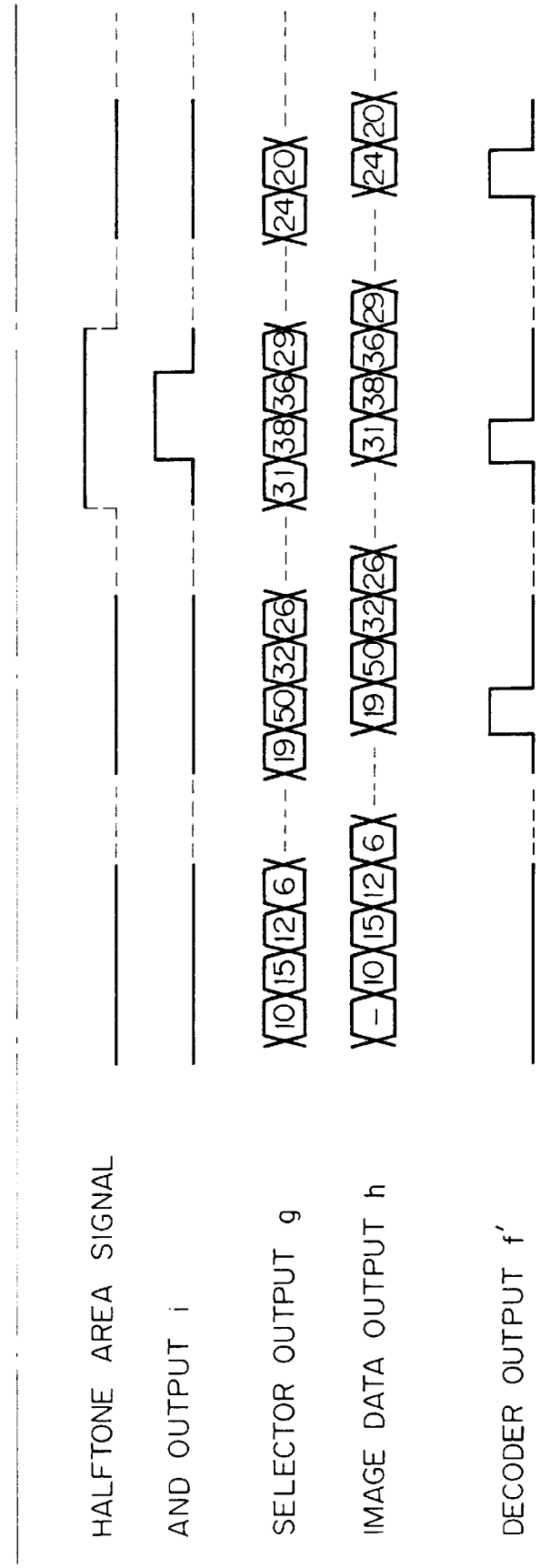

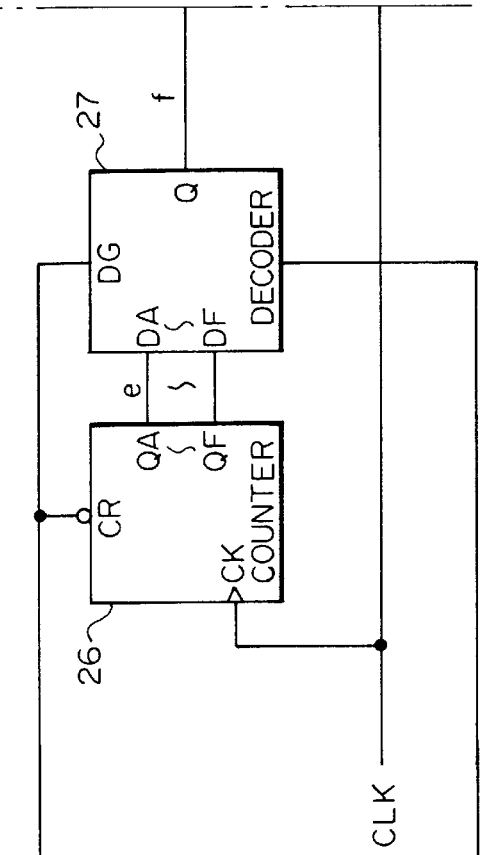

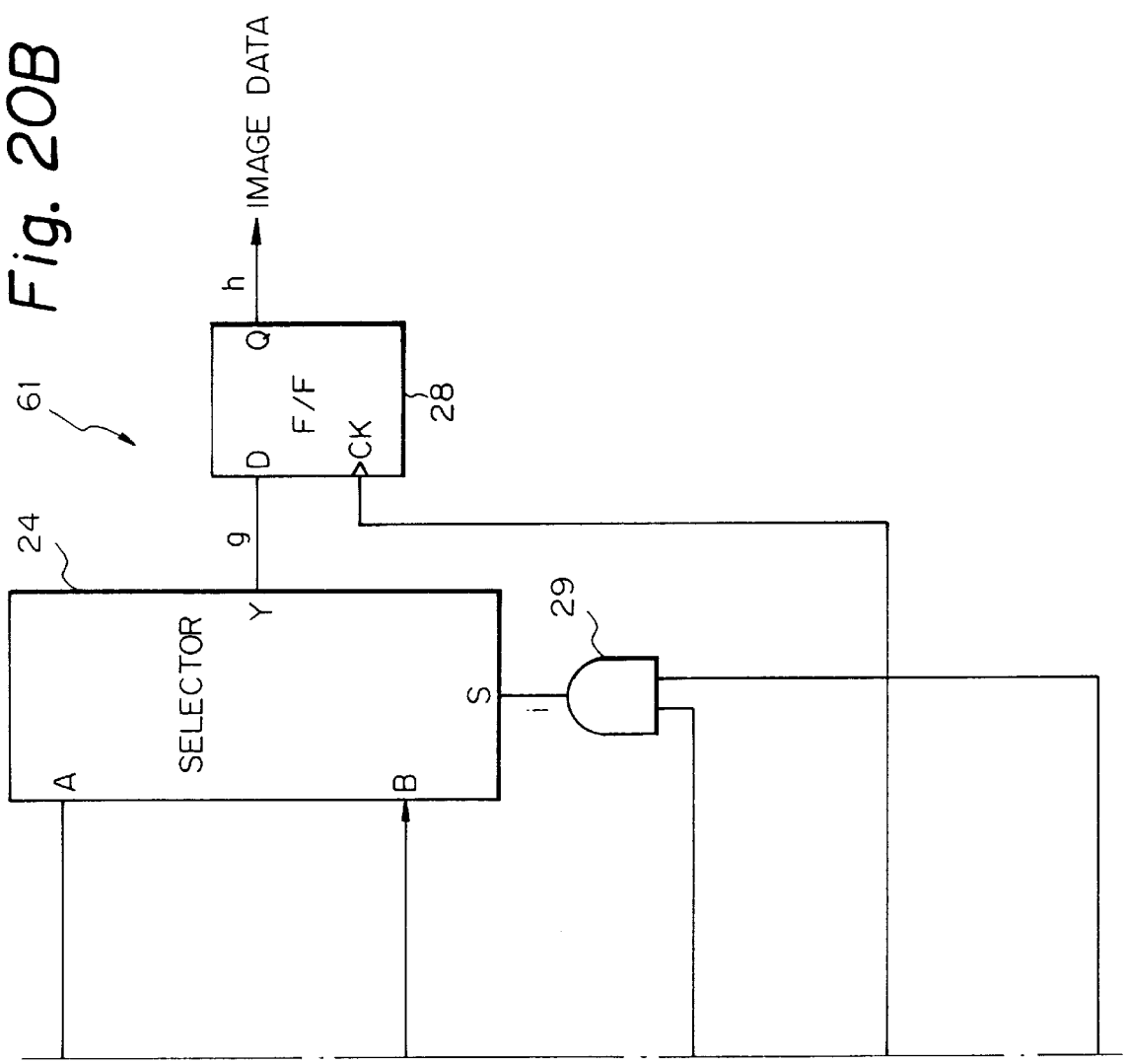

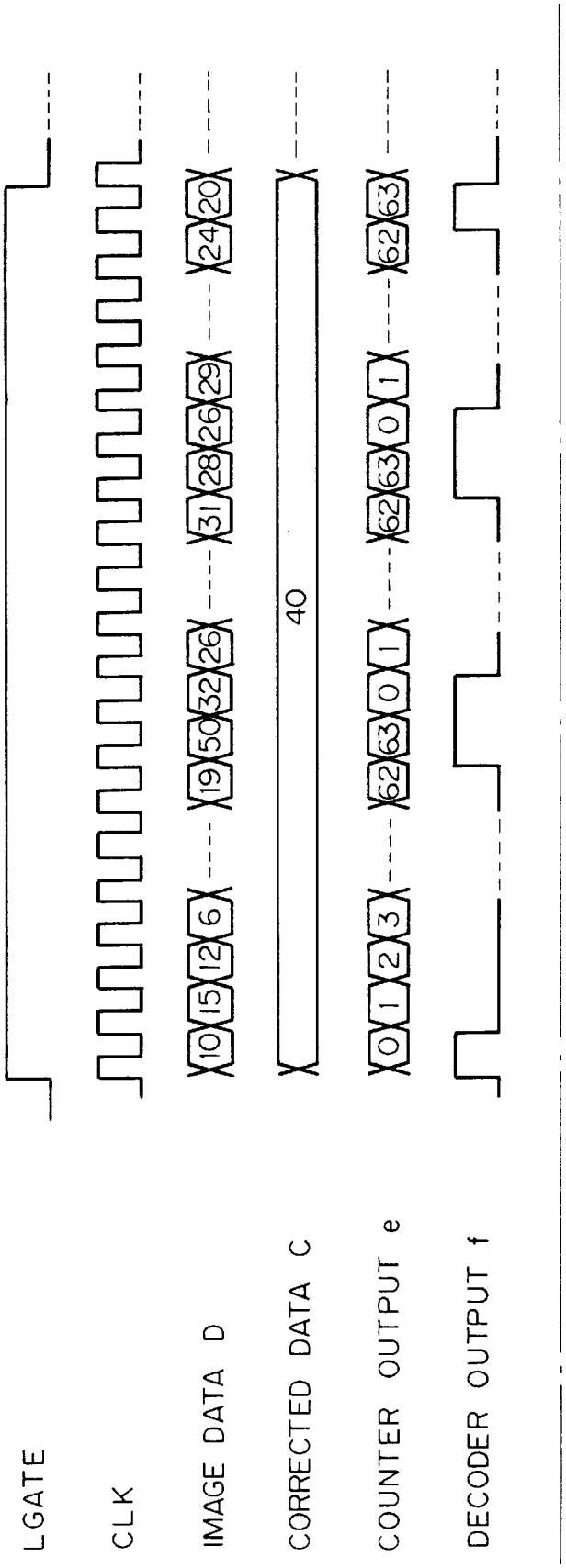

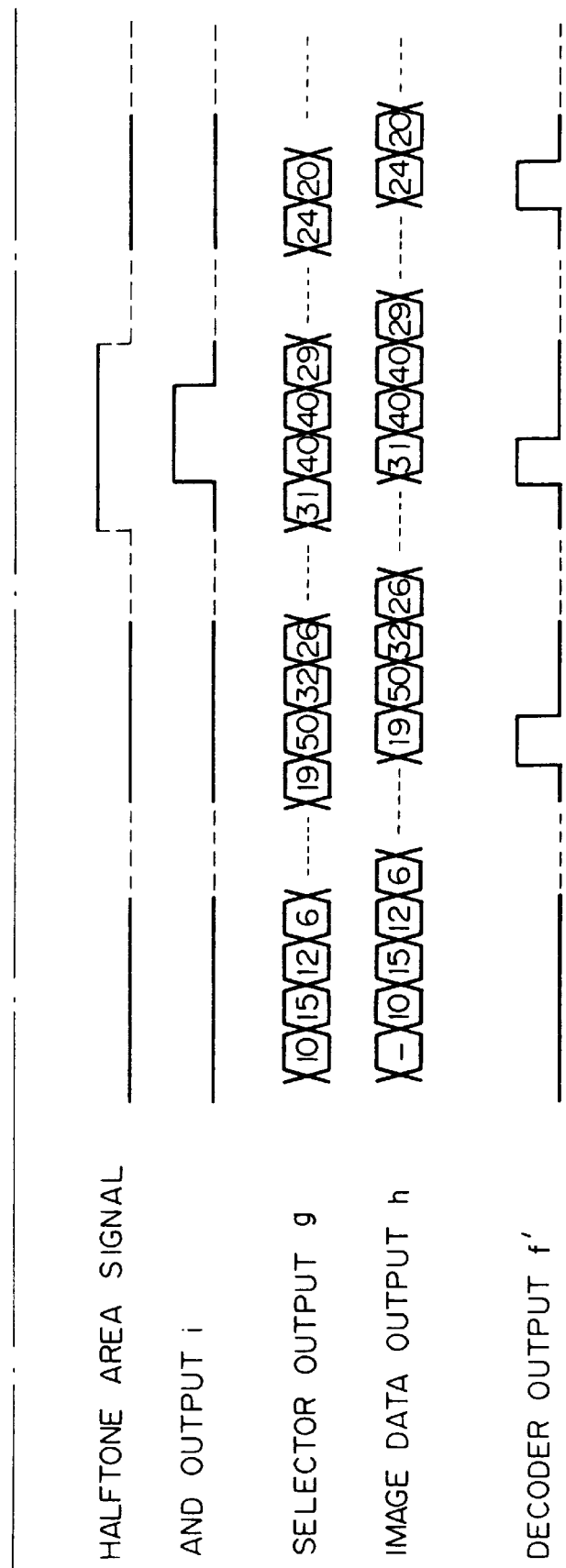

WRITING DEVICE FOR AN IMAGE FORMING APPARATUS

BACKGROUND OF THE INVENTION

1. Field of the Invention

The present invention relates to a digital copier, printer, facsimile apparatus or similar image forming apparatus and, more particularly, to a writing device for use in an image forming apparatus for electrostatically forming a latent image on an image carrier with a light emitter array.

2. Discussion of the Background

A writing device using a light emitter array, particularly an LED (Light Emitting Diode) array, is extensively used in an image forming apparatus in order to reduce the overall size of the apparatus. In an image forming apparatus including the LED array, a photoconductive element in the form of a belt or a drum has its surface uniformly charged by a charger while in rotation. The LED array exposes the charged surface of the photoconductive element imagewise so as to electrostatically form a latent image thereon. After the latent image has been transformed to a corresponding toner image by a developing device, the toner image is transferred to a paper or similar recording medium. The LED array constituting the writing device has a plurality of e.g., seventy-eight LED chips arranged in an array and each having a plurality of, e.g., sixty-four LEDs or light emitters corresponding pixels. The number of LEDs of each LED chip is selected in accordance with a desired resolution.

Japanese Patent Laid-Open Publication Nos. 4-326854 and 4-326855 each discloses a bilevel image forming apparatus capable of reproducing desirable halftone images. The apparatus reduces a dot diameter for an image in which the distance between nearby dots is small, thereby preventing the image from being defaced. For an image in which the above distance is great, the apparatus increases the dot diameter in order to output a thick clear-cut image.

Specifically, the apparatuses taught in the above two documents both pertain to a bilevel image forming apparatus capable of rendering a halftone image by referencing observed pixel data and a plurality of pixel data surrounding the observed pixel on the same line, and variably adjusting the actual dot size for the observed pixel on the basis of the condition of such image data. The apparatus of Laid-Open Publication No. 4-326854 includes distance detecting means for determining distances between the observed pixel data and a print pit included in the surrounding data, and dot size control means for variably controlling the actual dot size of the observed image data on the basis of the above distance. On the other hand, the apparatus of Laid-Open Publication No. 4-326855 includes transition point detecting means for detecting transition points of the observed image data and surrounding image data from a print pit to a non-print pit or from a non-print pit to a print pit, counting means for counting the transition points, and dot size control means for variably controlling the actual dot size of the observed image data on the basis of the number of transition points.

Japanese Patent Laid-Open Publication No. 5-176131 discloses a scanning type image forming apparatus capable of preventing observed black data from being shifted and thereby implementing a dot diameter close to a theoretical single pixel. Specifically, the scanning type image forming apparatus includes an analog image signal generating section for generating an analog image signal. An analog-to-digital converting section transforms the analog image signal to a digital image signal. A bilevel processing section binarizes the digital image signal by use of a preselected reference level to thereby output a bilevel image signal. The reference level is output from a reference level generating section. The data of the binary image signal are written to a pixel data memory. A laser ON/OFF signal generator generates a laser ON/OFF signal for selectively turning on or turning off a laser. A laser signal modulating section modulates the laser ON/OFF signal with the bilevel image signal stored in the memory. A laser power switching signal generating section switches laser power for pixels around an observed pixel in order to adjust the density of the observed pixel. A laser power generating section causes the laser to emit in accordance with the output of the laser signal modulating section and laser power switching signal. A laser scanning section causes a laser beam to scan a photoconductive element so as to expose the element imagewise.

A problem with the conventional image forming apparatus or image recording apparatus is that when a photograph or similar halftone image is output, the image appears as if it were slightly lost in places. This is ascribable to some error in the distance between nearby LED chips although the LEDs of each LED chip are regularly arranged to implement a desired resolution. The resulting image therefore appears as if it were lost at the intervals between nearby LED chips. This occurrence is particularly true with a halftone image, as follows. In the case of a high density image, a light beam issuing from the individual LED has a great diameter. As a result, dots formed by the LEDs on the image carrier tend to overlap each other, rendering the local omission of the image inconspicuous. However, in the case of a low density image, the beam issuing from the individual LED has a small diameter with the result that the local omission ascribable to an error in the distance between the LED chips is conspicuous.

The local omission of an image will be obviated if the image data of the pixels corresponding to the interval between nearby LED chips are increased by a preselected amount or converted to a density rendering the local omission inconspicuous. However, if such image data are simply corrected, even the image data representative of white will be corrected and will thereby form thin vertical lines on a white background. In addition, even image data sufficiently high in density and not needing correction will be corrected.

SUMMARY OF THE INVENTION

It is therefore an object of the present invention to provide a writing device for an image forming apparatus and which is capable of obviating the local omission of an image ascribable to an error in the distance between nearby light emitter chips of a light emitter array and thereby insuring smooth images.

In accordance with the present invention, a writing device for an image forming apparatus includes a light emitter array having a plurality of light emitter chips arranged in an array and each having a plurality of light emitters also arranged in an array, for writing an image on a photoconductive element line by line by scanning the element. A light emitter array controller controllably drives the individual light emitter in accordance with image data. A data correcting section corrects, among the image data input to the light emitter array controller, the image data corresponding to a particular position of the light emitter array.

Also, in accordance with the present invention, a writing device for an image forming apparatus includes a light emitter array having a plurality of light emitter chips arranged in an array and each having a plurality of light emitters also arranged in an array, for writing an image on a photoconductive element line by line by scanning the element, a light emitter array controller for controllably driving the light emitters of the light emitter array in accordance with image data. A data correcting section corrects, among the image data input to the light emitter array controller, the image data corresponding to a particular position of the light emitter array. A data decision section determines a condition of the image data corresponding to the particular position or the image data lying in a preselected region including the particular position. The data correcting section corrects the image data in accordance with the result of decision output from the data decision section.

BRIEF DESCRIPTION OF THE DRAWINGS

The above and other objects, features and advantages of the present invention will become apparent from the following detailed description taken with the accompanying drawings in which:

FIG. 6 is a block diagram schematically showing a data correcting section included in the image data processing system;

FIG. 7 is a timing chart demonstrating a specific operation of the data correcting section shown in FIG. 6;

FIG. 9 is a block diagram schematically showing an LED control section included in the writing section shown in FIG. 8;

FIGS. 14A and 14B respectively show dots written by the conventional writing device and dots written by the illustrative embodiment;

FIG. 15 is a block diagram schematically showing a data correcting section representative of an alternative embodiment of the present invention;

FIG. 20 is a block diagram schematically showing another specific configuration of the arrangement for data correction; and FIG. 21 is a timing chart demonstrating a specific operation of the arrangement shown in FIG. 20.

DESCRIPTION OF THE PREFERRED EMBODIMENT

Figure 1:
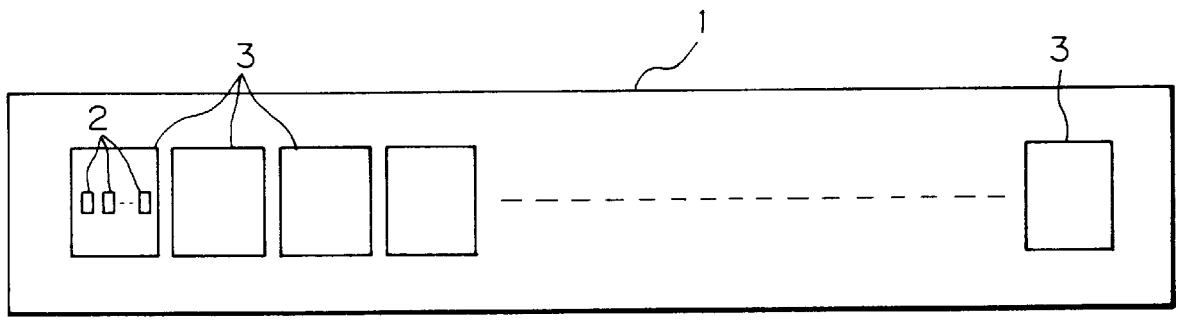
FIG. 1 is a block diagram schematically showing a conventional LED array constituting a writing device.

To better understand the present invention, brief reference will be made to a conventional writing device for use in a printer, digital copier or similar electrophotographic image forming apparatus, shown in FIG. 1. The writing device electrostatically forms a latent on the uniformly charged surface of an image carrier with an array of light emitters. As shown, the writing device includes an LED array 1 made up of a plurality of (e.g. seventy-eight) LED chips 3 arranged in an array and each having a plurality of (e.g. sixty-four) LEDs 2 corresponding to pixels. The number of LEDs 2 of each LED chip 3 is determined on the basis of a desired resolution.

Figure 2:
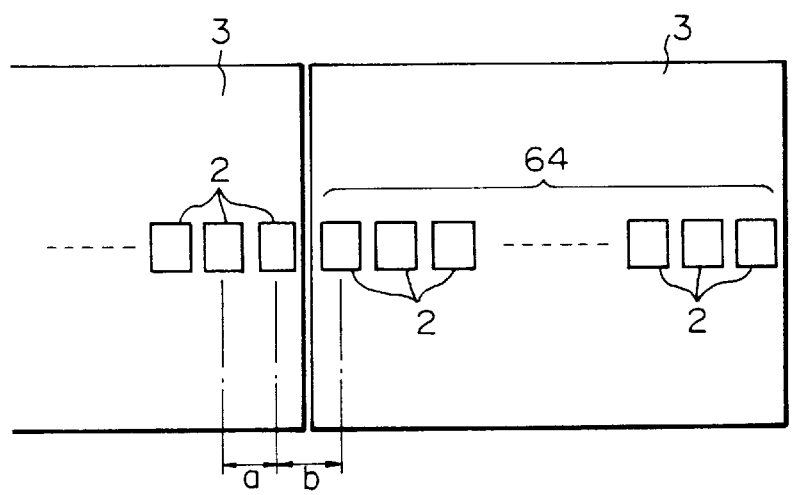
FIG. 2 is a block diagram schematically showing an essential part of the LED array of FIG. 1 in an enlarged scale.

The problem with an image forming apparatus using the above writing device is that an output image appears as if it were slightly lost in places. This is ascribable to some error in the distance between nearby LED chips 3 although the LEDS 2 of each LED chip 3 are regularly arranged to implement a desired resolution. Specifically, as shown in FIG. 2, when the distance b between nearby chips 3 is greater than a usual distance and greater than the distance a between nearby LEDs 2, the resulting image appears as if it were lost at the intervals between nearby LED chips 3.

Figure 3A:
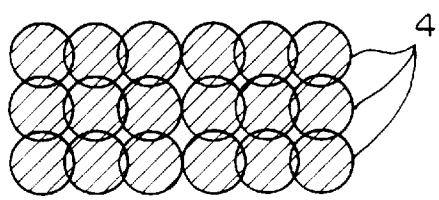
FIGS. 3A and 3B show dots written by the conventional writing device.
Figure 3B:
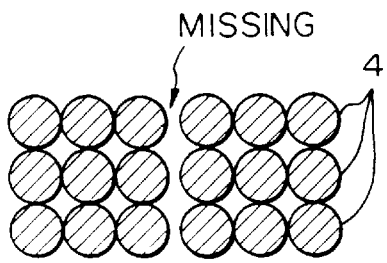

The above occurrence is particularly true with a halftone image, as follows. As shown in FIG. 3A, in the case of a high density image, a light beam missing from each individual LED 2 has a great diameter. As a result, dots 4 formed by the LEDs 2 on the image carrier tend to overlap each other, rendering the local omission of the image inconspicuous. However, in the case of a low density image, each beam issuing from the individual LED 2 has a small diameter, as shown in FIG. 3B, with the result that the local omission ascribable to an error in the distance b between the LED chips 3 is conspicuous.

Figure 4:
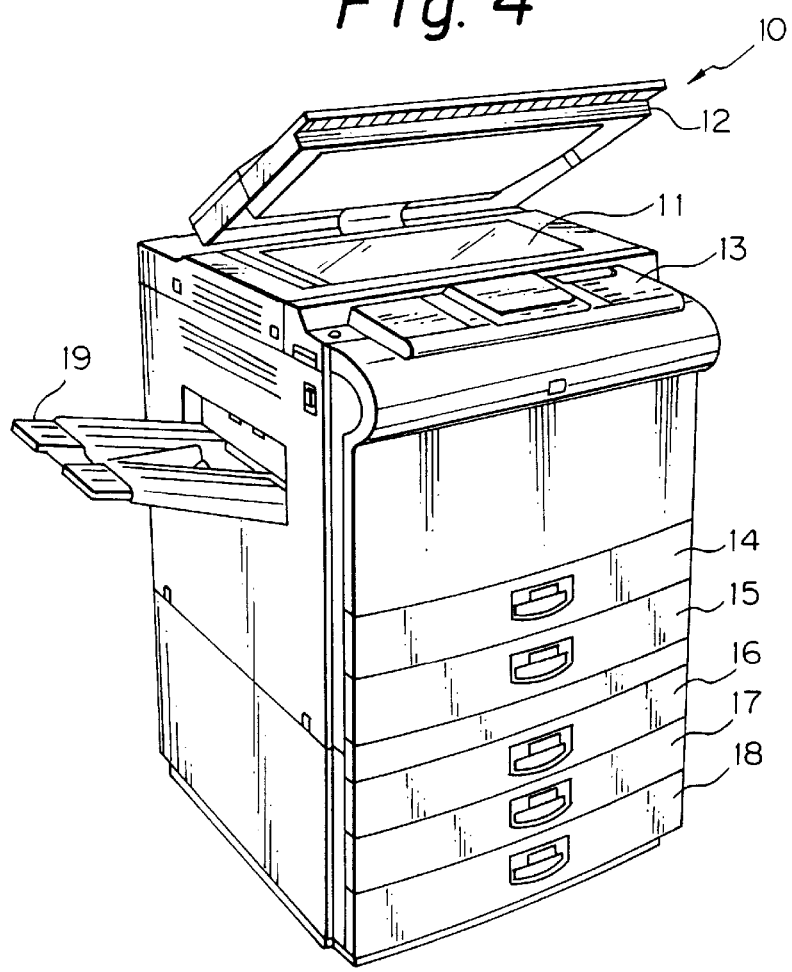
FIG. 4 is a perspective view showing an electrophotographic image forming apparatus to which a writing device embodying the present invention is applied.

Referring to FIG. 4, an electrophotographic image forming apparatus to which a writing device embodying the present invention is applied is shown and implemented as a digital copier by way of example. As shown, the digital copier, generally 10, has a glass platen 11, a cover plate 12 and an operation panel 13 arranged on its top. The cover plate 12 may be replaced with an ADF (Automatic Document Feeder) not shown. A document, not shown, is laid on the glass platen 11 and pressed against the plate 11 by the cover plate (or a conveyor belt included in the ADF) 12. The operation panel 13 is accessible for inputting a desired document reading mode, magnification and so forth while displaying information meant for the operator. A plurality of (five in the embodiment) paper feed sections 14–18 are arranged in the lower portion of the copier 10. A paper discharge section 19 is provided on the left side of the copier 10, as viewed in FIG. 4. The copier 10 accommodates therein a document reading device including focusing optics, a paper conveying device, a photoconductive drum or similar image carrier, a charger, a developing device, an image transferring device, a fixing device, a paper discharging device, a cleaning device, a discharger and other conventional devices for effecting an electrophotographic process, and a controller for controlling them, although not shown specifically.

The document reading device includes a light source for illuminating a document laid on the glass platen 11. The resulting reflection from the document is incident to a CCD (Charge Coupled Device) image sensor or line sensor via the optics. The light source and a part of the optics are moved to sequentially scan the document so as to read an image out of the document with a resolution of, e.g., 400 dpi (dots per inch). An analog image signal output from the image sensor and representative of the document image is transformed to digital image data by an analog-to-digital converter (ADC). The digital image data are subjected to various kinds of correction, which will be described later, and are then input to a writing device embodying the present invention. The writing device also uses the LED array 1 stated earlier. Specifically, the writing device drives the LEDs 2 arranged in an array in the main scanning direction in accordance with the image data. As a result, the LEDs 2 emit light beams toward the photoconductive drum.

While the photoconductive drum is rotated by a drive section in the subscanning direction, the charger uniformly charges the surface of the drum. The LEDs 2 of the LED array expose the charged surface of the drum imagewise so as to write the document image, one line at a time. As a result, a latent image corresponding to the document image is electrostatically formed on the drum. The developing device develops the latent image with toner and thereby forms a toner image on the drum. A paper or similar recording medium is fed from one of the paper feed sections 14–18 selected on the operation panel 13 to the drum by the conveying device. The toner image is transferred from the drum to the paper and then fixed by the fixing device. The paper with the fixed toner image is driven out of the copier body to the paper discharge section 19. After the image transfer, the cleaning device removes the toner left on the drum while the discharger dissipates charge also left on the drum. The controller controls the document reading device and other devices in response to commands input on the operation panel 13.

Figure 5:
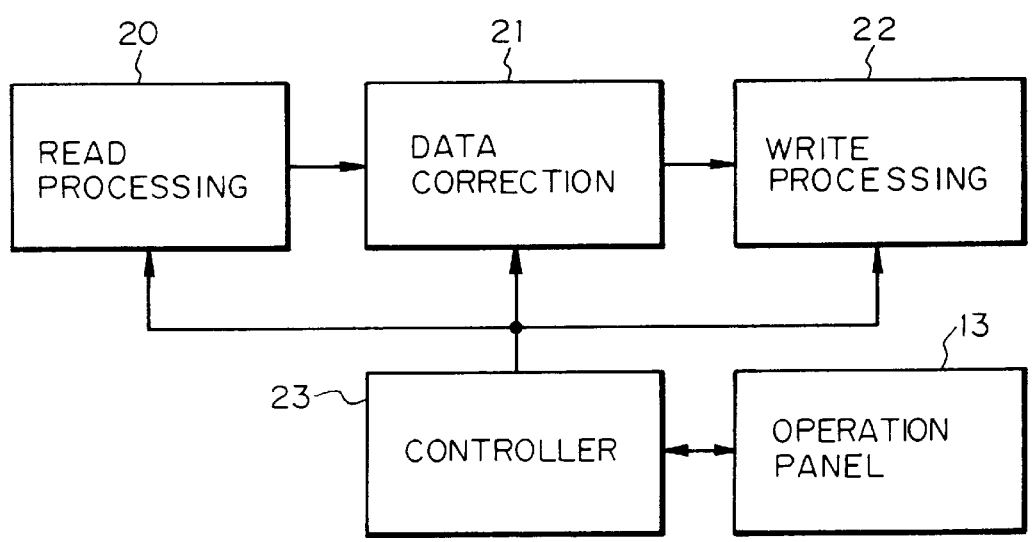
FIG. 5 is a block diagram schematically showing an image data processing system included in the apparatus of FIG. 1.

FIG. 5 shows an image data processing system included in the copier 10. As shown, the system includes a read processing 20 for executing various kinds of correction, including shading correction, with the digital image data output from the ADC mentioned earlier. The read processing 20 delivers corrected image data D to a data corrector or data correcting means 21 while assigning six bits to a single bit (sixty-four tones; 0/63 through 63/63). The data correction 21 corrects, among the image data D input from the read processing 20, the particular image data corresponding to each interval between nearby LED chips 3 in such a manner as to increase the quantity of light to issue from the corresponding LEDs 2. For this purpose, the data correction 21 increases the values of the above particular image data or converts them to a preselected value. When the image data around the intervals between the nearby LED chips 3 are representative of halftone, the data correction 21 also executes the above processing. The corrected image data are fed to a write processing 22. The write processing 22 drives the LEDs 2 of the LED array 1 in accordance with the input image data, thereby writing the document image on the drum with the resolution of 400 dpi.

A controller 23 is connected to the operation panel 13 and controls the read processing 20, data correction 21 and write processing 22 on the basis of the mode and other various information input via the panel 13. The data correction 21 and write processing 22 constitute the writing device.

FIG. 6 shows a specific configuration of the data correction 21 while FIG. 7 shows the operation timing of the data correction 21. As shown, the image data D output from the read processing 20 are input to a selector or selecting means 24 and an adder or adding means 25. The adder 25 adds to the image data D a preselected correction value, e.g., "10" assigned thereto by the controller 23, thereby correcting the image data D. The corrected image data labeled c, are fed from the adder 25 to the selector 24. The selector 24 selects the corrected image data c at the intervals between nearby LED chips 3, but selects the image data D output from the read processing 20 at positions other than the above intervals.

A counter 26 and a decoder 27 shown in FIG. 6 constitute interval detecting means. Because each LED chip 3 has sixty-four LEDs 2, as stated earlier, image data corresponding to an interval between nearby LED chips 3 appears every sixty-four pixels. When an image data valid signal LGATE output from the controller 23 goes high, the counter 26 starts counting the image data in synchronism with a reference clock CLK. While the signal LGATE remains in its high level, the counter 26 continuously counts the image data in synchronism with the reference clock CLK. It is to be noted that the image data are valid only when the signal LGATE is in its high level.

The counter 26 implemented as a six-bit counter products an output signal e which sequentially varies from "0" to "63". The signal e is fed to a decoder 27 together with the image data valid signal LGATE and a decode switching signal output from the controller 23. The decoder 27 produces an output signal f. While the signal LGATE is in its high level, the decoder output f goes high if the counter output e is "0" or "63" in accordance with the decode switching signal, or goes low if otherwise. If desired, the decoder output f may be replaced with a decoder output f' which goes high only when the counter output e is "63" in accordance with the decode switching signal. The decoder output f or f' is input to the selector 24 as a selector switching signal.

The selector 24 selects the image data D output from the read processing 20 when the selector switching signal f output from the decoder 27 is in its low level, or selects the corrected image data c output from the adder 25 when the signal f is in its high level. A flip-flop (F/F) 28 latches image data g output from the selector 24 in response to the reference clock CLK so as to regulate their phase. Regulated image data h output from the F/F 28 are fed to the write processing 22. In FIG. 7, numerals attached to the image data are representative of specific signal levels.

Figure 8:
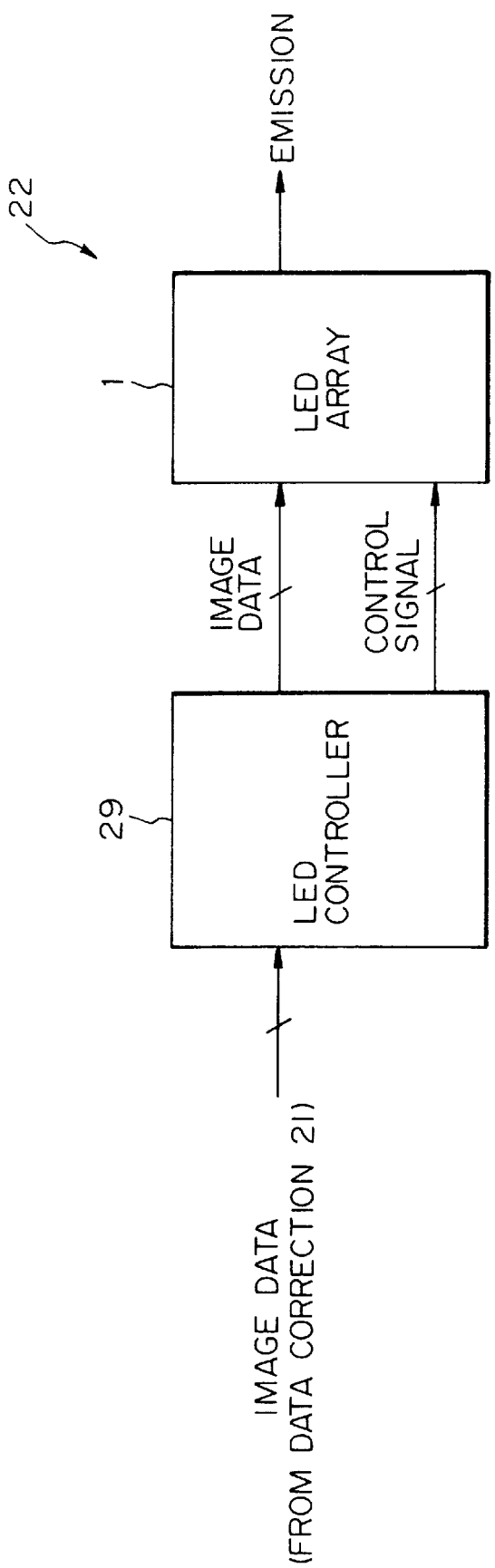
FIG. 8 is a block diagram schematically showing a writing section also included in the image data processing system.

FIG. 8 shows a specific configuration of the write processing 22. As shown, the write processing 22 has the LED array 1 and an LED controller or light emitter array control means 29. The LED controller 29 converts the image data input from the data correction 21 in conformity to a data input system particular to the LED array 1, corrects the quantity of light of the LED array 1, and generates a control signal. The LED array 1 emits light in accordance with the image data converted by the LED controller 29 and thereby exposes the previously stated drum imagewise. As a result, a latent image is electrostatically formed on the drum, as stated earlier. As shown in FIG. 9, the LED controller 29 is made up of a control signal generator 30 and an image data converting section 31 having line memories 32–35 and a data selector 36.

A specific operation of LED controller 29 will be described with reference also made to a timing chart shown in FIG. 10. When write enable signals WE fed from the control signal generator 30 to the line memories 32 and 34 are in their high level, the image data input from the data correction 21 and representative of the former halves of consecutive lines are respectively written to the line memories 32 and 34. When write enables signals WE fed from the control signal generator 30 to the line memories 33 and 35 are in their high level, the latter halves of the above lines are written to the line memories 33 and 35.

The line memories 32 and 33 and line memories 34 and 35 operate in a toggle fashion, as follows. When the write enable signals WE fed to the line memories 32 and 33 go high in order tow rite the image data in the line memories 32 and 33, the image data are read out of the line memories 34 and 35 while read enable signals RE fed from the control signal generator 30 to the line memories 34 and 35 are in their high level. Conversely, when read enable signals RE fed to the line memories 32 and 33 from the control signal generator 30 go high in order to read the image data out of the line memories 32 and 33, the image data are written to the line memories 34 and 35 while write enable signals WE fed from the control signal generator 30 to the line memories 34 and 35 are in their high level.

Figure 10A:
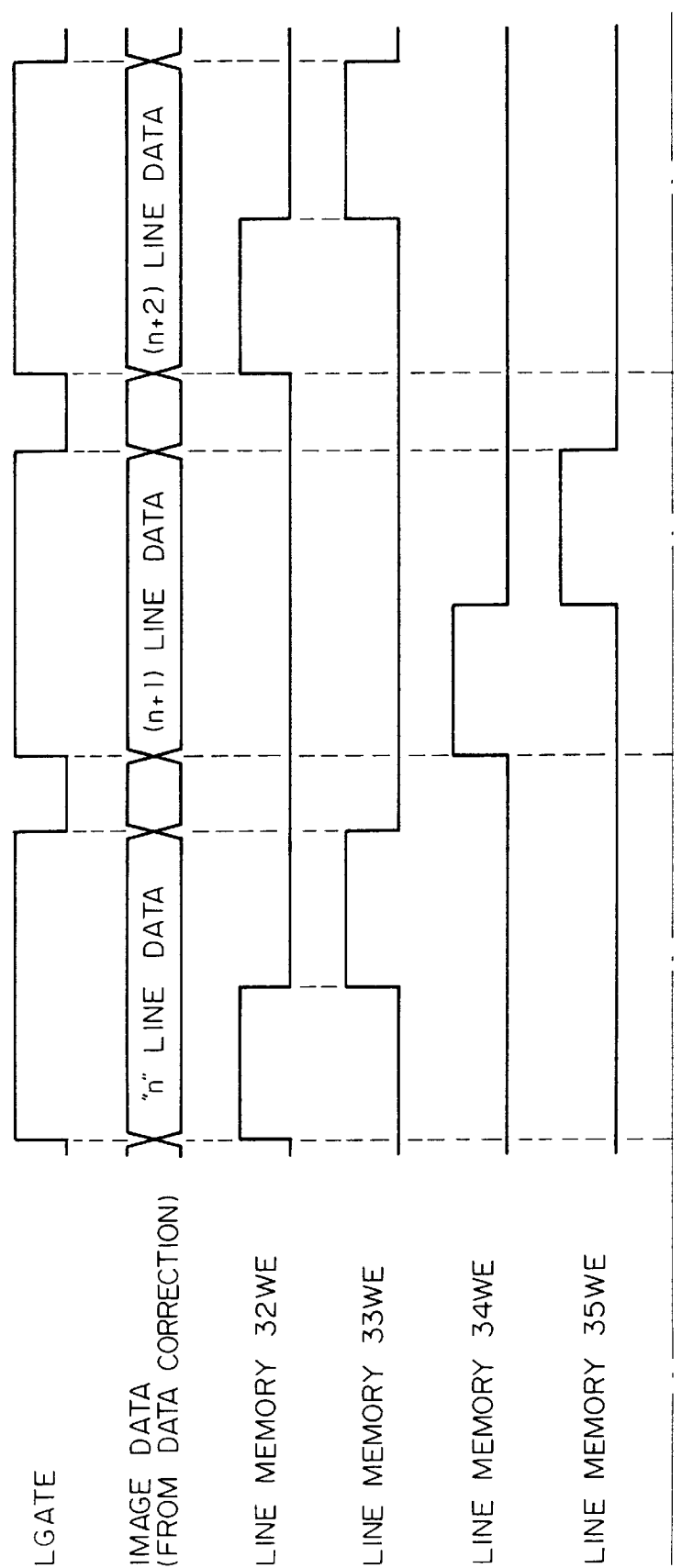
FIG. 10 is a timing chart representative of a specific operation of the LED control section shown in FIG. 9.

For example, as shown in FIG. 10, assume that the former half and latter half of the "n" line of image data are written to the line memories 32 and 33, respectively. Then, at this time, the former half and latter half of the "n−1" line are read out of the line memories 34 and 35, respectively. Conversely, when the former half and latter half of the "n+1" line are written to the line memories 34 and 35, the former half and latter half of the "n" line written to the line memories 32 and 33 are read out.

The data selector 36 selects, in response to a selector switching signal fed from the control signal generator 30, one of the image data read out of the line memories 32–35 at a time and thereby outputs the former half and latter half of each line at the above period. The image data are read out of the line memories 32–35 in the form of a former half and a latter half of a line, as stated above. Therefore, if the image data should only be read out of the line memories within one period, a read clock for reading the image data out of the line memories pixel by pixel may have its period reduced to one-half at most. However, because one period must include a period of time for causing the LED array 1 to emit, the illustrative embodiment reads the image data out of the line memories 32–35 during a period of time which is 60% to 70% of one period.

The control signal generator 30 generates the above various signals, i.e., the write enable signals WE and read enable signals RE meant for the line memories 32–35, write clock, read clock, and selector switching signal meant for the data selector 36. The image data read out of the line memories 32 and 33 are valid when the selector switching signals is in its high level, or the image data read out of the line memories 34 and 35 are valid when the switching signal is in its low level. Further, the control signal generator 30 generates an image transfer clock TCK, a transfer end signal SET and an emission valid signal EN for the LED array 1.

Figure 11:
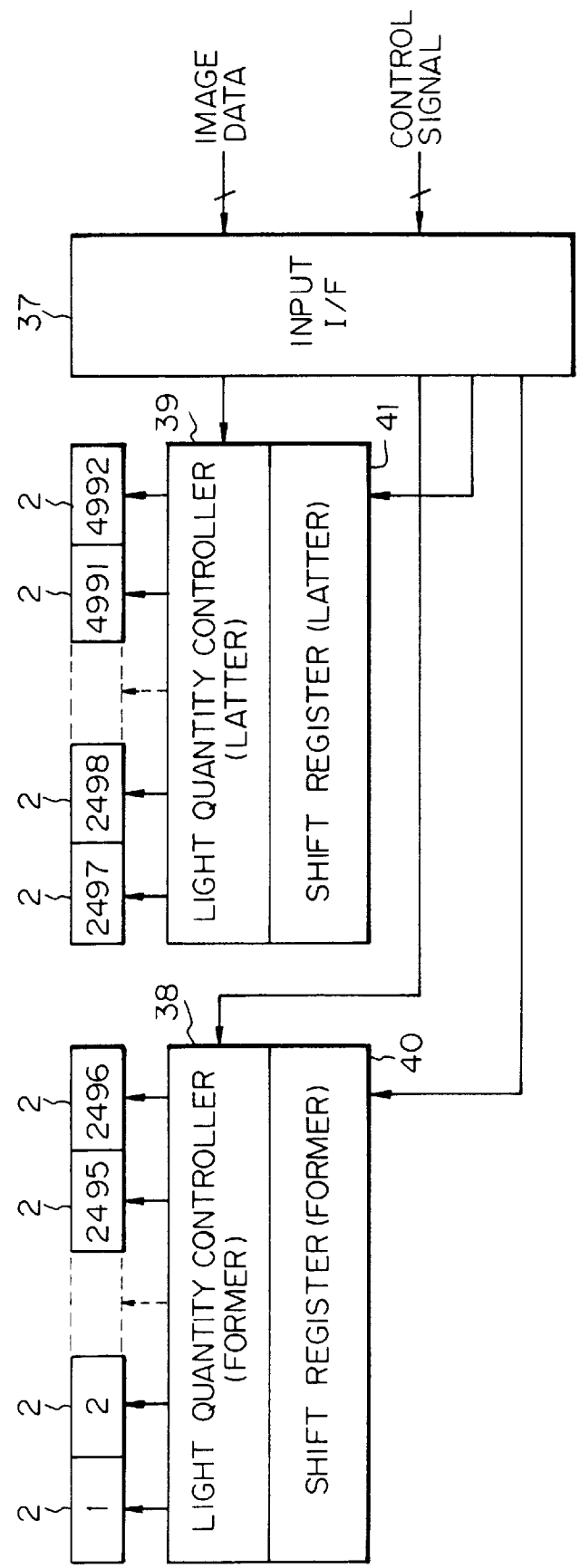
FIG. 11 is a block diagram schematically showing the arrangement of an LED array also included in the writing section.

Referring to FIG. 11, the circuit arrangement of the LED array 1 will be described. As shown, the LED array 1 includes 4,992 (64×78) LEDs 2. An input interface (I/F) 37 receives the image data output from the LED controller 29 and control signals output from the LED controller 29 and delivers them to various sections constituting the LED array 1. Light quantity controllers 38 and 39 control the quantities of light to issue from the LEDs 2 in accordance with the value of the image data. Shift registers 40 and 41 sequentially transfer the image data received from the input I/F 37. The two light quantity controllers 38 and 39 and two shift registers 40 and 41 are respectively assigned to the former half and latter half of one line.

Figure 12:
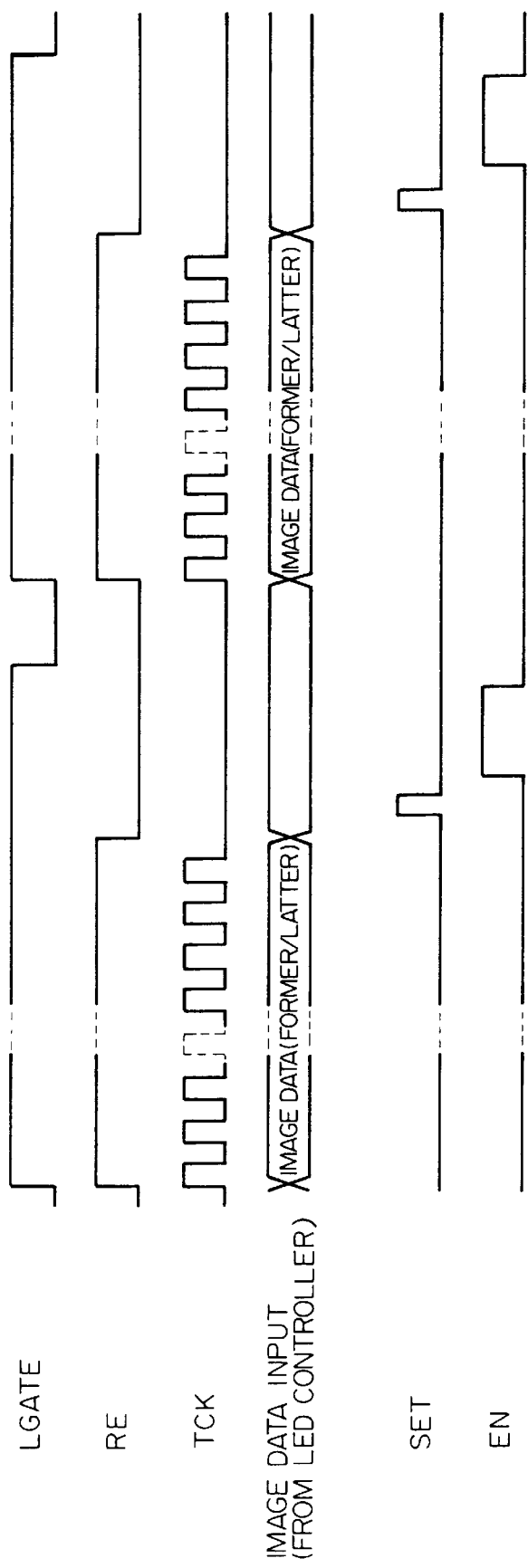
FIGS. 12 and 13 are timing charts demonstrating a specific operation of the LED array.

As shown in a timing chart in FIG. 12, when the read enable signal RE is in its high level, the former half and latter half of each line fed from the LED controller 29 are respectively input to the shift registers 40 and 41 via the input I/F 37. The former half and latter half are respectively sequentially transferred in the shift registers 40 and 41 in synchronism with the transfer clock TCK input to the shift registers 40 and 41 via the input I/F 37. On the transfer of one full line of image data, the LED controller 29 sends the transfer end signal to the light quantity controllers 38 and 39 via the input I/F. In response, the light quantity controllers 38 and 39 respectively latch the former half and latter half of one line of image data. The emission valid signal ED input to the controllers 38 and 39 from the LED controller 29 via the input I/F 37 has a duration corresponding to sixty-three clock pulses of an emission clock LCLK (=TCK×10).

Figure 13:
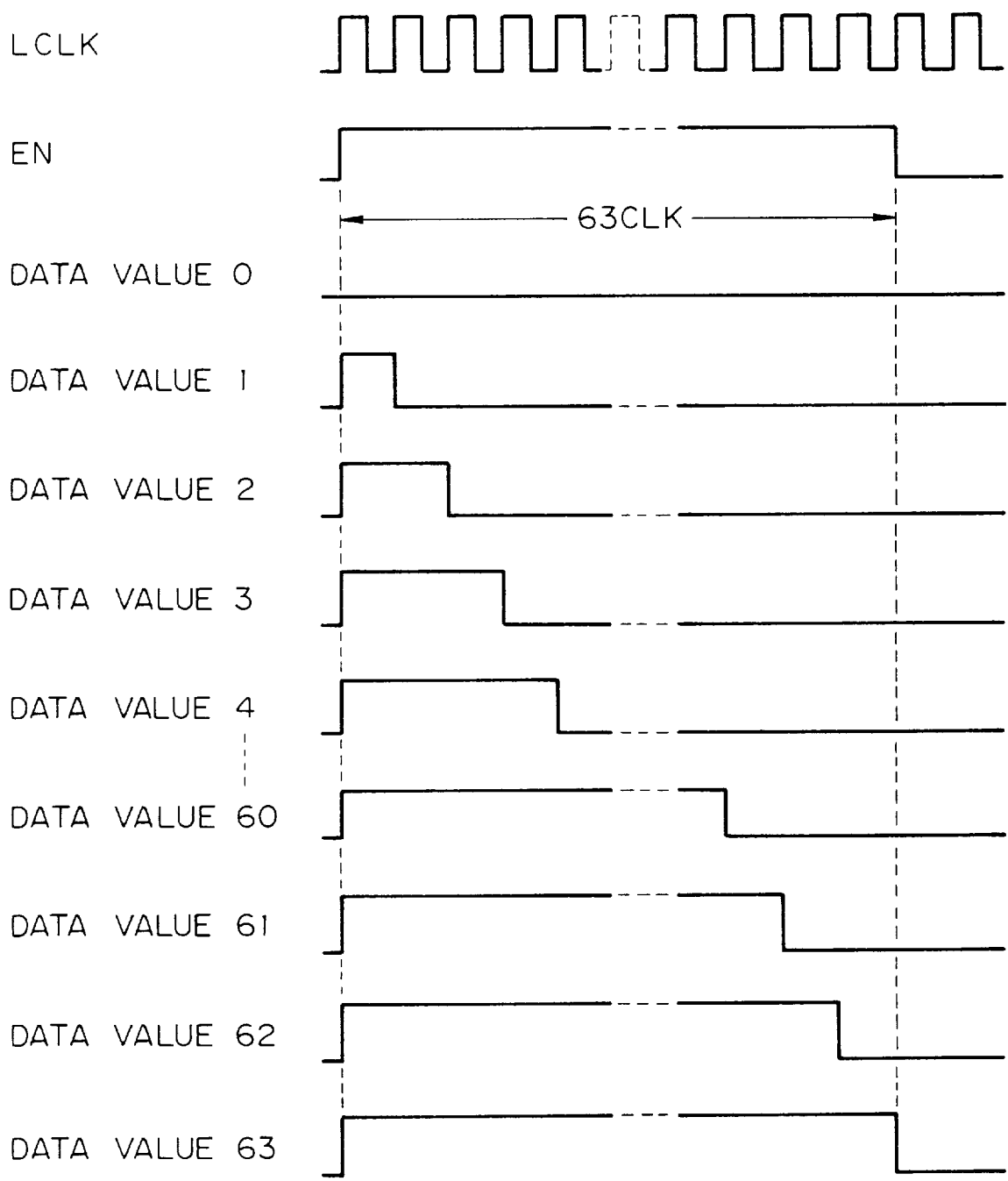

As shown in FIG. 13, the light quantity controllers 38 and 39 each generates out of the emission valid signal EN sixty-four signals having durations of high level which respectively correspond to zero clock pulse to sixty-three clock pulses of the emission clock LCLK. The controllers 38 and 39 each selects one of the sixty-four signals whose duration of high level matches with the value of the image data latched previously. For example, when the value of the image data is "1", the controller 38 or 39 selects one of the above signals which remains in its high level for a duration corresponding to one clock pulse of the emission clock LCLK. Likewise, when the value of the image data is "2", the controller 38 or 39 selects the signal which remains in its high level for a duration corresponding to two clock pulses of the emission clock LCLK. Further, when the value of the image data is "3", each controller 38 or 39 selects the signal which remains in its high level for a duration corresponding to three clock pulses. When the value of the image data is "0", the controller 38 or 39 does not select any one of such signals.

The light quantity controllers 38 and 39 select, for one line of image data latched previously, the signals remaining in their high level for durations corresponding to the pixel-by-pixel image data values as drive signals. With the drive signals, the controllers 38 and 39 cause the LEDs 2 of the LED array 1 corresponding to one line of image data to turn on while the emission signals remain in their high level. In this manner, the controllers 38 and 39 vary the turn-on durations of the LEDs 2 in accordance with the values of the associated image data. As a result, the quantities of light to issue from the LEDs 2 are varied to implement multilevel image writing.

FIG. 14A shows dot 4 representative of a low density image and output without the above image data correction as in the conventional writing device. As shown, the image is lost at the position corresponding to an interval between nearby LED chips 3. FIG. 14B shows dots 4 representative of a low density image and output after the image data correction particular to the illustrative embodiment. As shown, the low density image is free from omission at the interval between nearby LED chips 3.

As stated above, in the illustrative embodiment, the data correction 21 corrects the image data corresponding to the intervals between nearby LED chips 3, i.e., increases the values of such data by a preselected amount in order to increase the quantities of light to issue from the associated LEDs 2. This successfully obviates the local omission of a halftone image in the form of white stripes and thereby enhances image quality.

As alternative embodiment of the present invention will be described hereinafter. The structural elements of the alternative element identical with the elements of the previous embodiment are designated by identical reference numerals.

FIG. 15 shows a configuration of the data correction 21 representative of the alternative embodiment. As shown, the data correction 21 includes a halftone area detector or data decision means 60 for determining whether or not the image data to be corrected and image data surrounding it are of halftone. A data corrector or data correcting means 61 actually corrects the image data on the basis of the result of decision output from the halftone area detector 60.

Figure 16B:
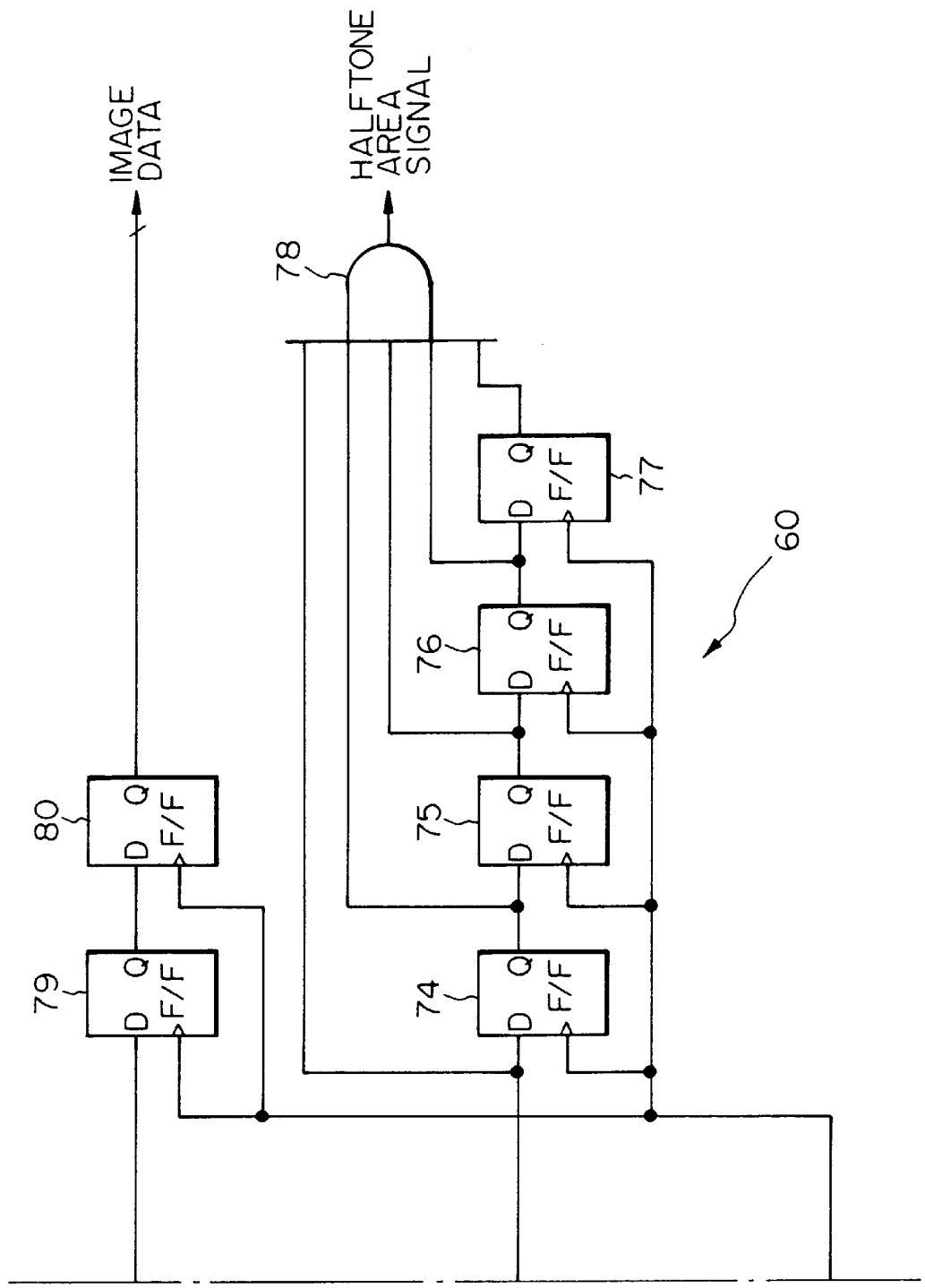
FIG. 16 is a block diagram schematically showing a halftone area detecting section included in the data correcting section shown in FIG. 15.
Figure 17B:
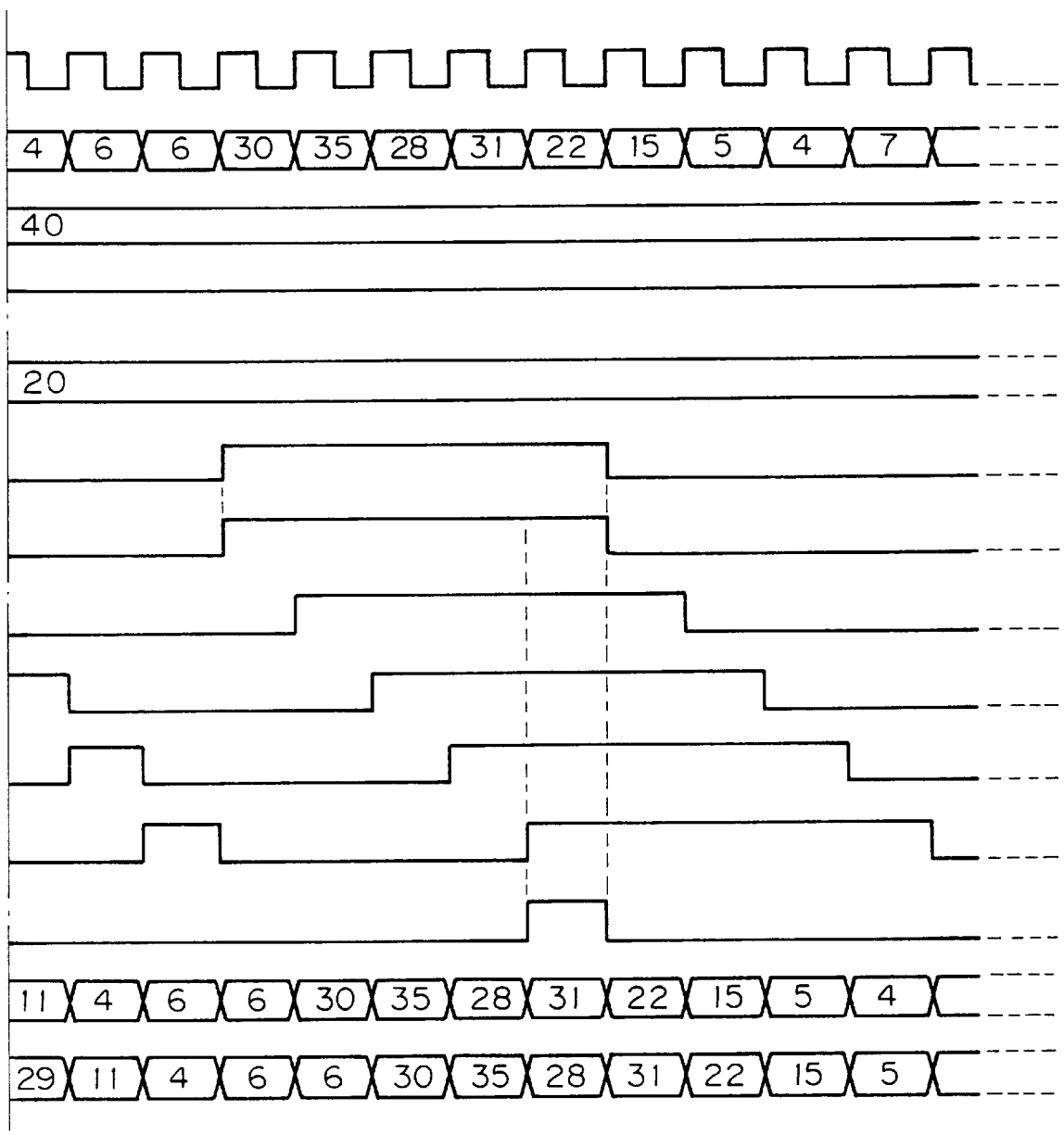
FIG. 17 is a timing chart showing a specific operation of the halftone area detecting section.

FIG. 16 shows a specific configuration of the halftone area detector 60 while FIG. 17 shows the operation timing of the detector 60. As shown, the halftone area detector 60 has comparators 71 and 72, AND gates 73 and 78, F/Fs 74–77, 79 and 80. The comparators 71 and 72 respectively compare the level of the image data with an upper threshold and a lower threshold assigned thereto by the controller 23, FIG. 5. When the image data is lower in level than the upper threshold, but higher than the lower threshold, the outputs of the comparators 71 and 72 both go high. An image whose density is higher than the upper threshold will be free from local omission when output. On the other hand, an image whose density is lower than the lower threshold will suffer from conspicuous black stripes when subjected to correction. The AND gate 73 ANDs the outputs of the comparators 71 and 72. Therefore, the output of the AND gate 73 goes high when the image data lies in the above particular range.

The output of the AND gate 73 is latched by the F/Fs 74–77. The AND gate 78 ANDs the output of the AND gate 73 and the outputs of the F/Fs 74–77. The output of the AND gate 78 is used as a halftone area signal. Specifically, in this embodiment, only when all of an observed pixel, two pixels preceding it and two pixels following it in the main scanning direction lie in the preselected range delimited by the upper and lower thresholds, the observed pixel is determined to be of halftone. The F/Fs 79 and 80 latch the image data in order to match the phase of the image data and that of the halftone area signal.

Figure 18A:
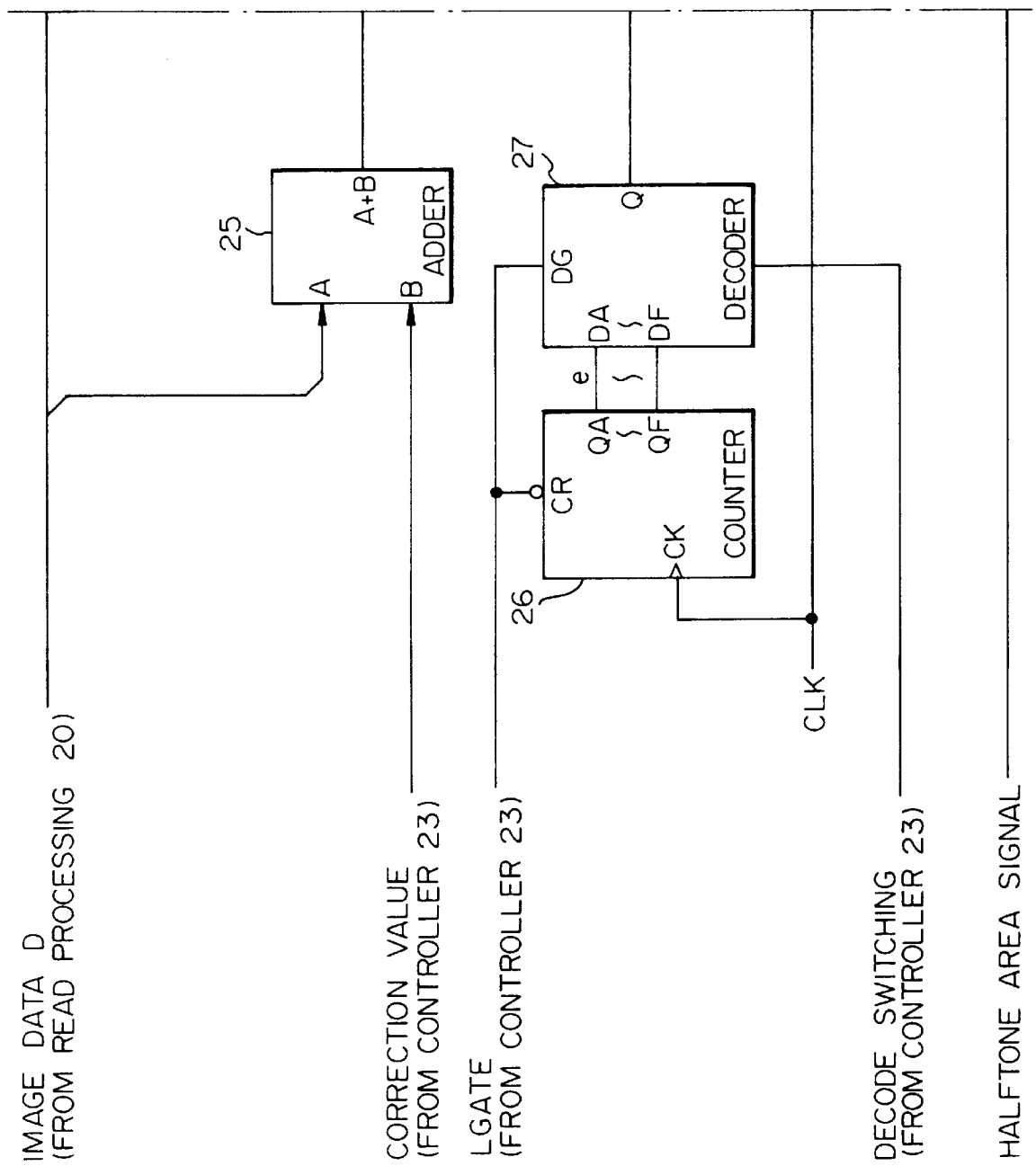
FIG. 18 is a block diagram schematically showing a specific configuration of an arrangement for data correction included in the data correcting section.

FIG. 18 shows a specific configuration of the data corrector 61 included in the data correction 21. The construction and operation of the data corrector 61 will be described with reference also made to FIG. 19. As shown, the image data D output from the read processing 20 and passed through the halftone area detector 60 are input to the selector 24 and adder 25. The adder 25 adds a preselected value, e.g., "10" to the image data D to thereby correct the image data D, as in the previous embodiment. The image data c output from the adder 25 are input to the selector 24. The selector 24 selects the corrected image data c if the image data corresponding to the interval between nearby LED chips 3 is of halftone, as determined by the halftone area detector 60, or selects the image data D output from the read processing if otherwise.

The counter 26 and decoder 27 constitute interval detecting means. Because each LED chip 3 has sixty-four LED elements 2, as stated earlier, image data corresponding to an interval between nearby LED chips 3 appears every sixty-four pixels. When the image data valid signal LGATE output from the controller 23 goes high, the counter 26 starts counting the image data in synchronism with a reference clock CLK. While the signal LGATE remains in its high level, the counter 26 continuously counts the image data in synchronism with the reference clock CLK. It is to be noted that the image data are valid only when the signal LGATE is in its high level.

The counter 26 implemented as a six-bit counter produces an output signal e which sequentially varies from "0" to "63". The signal e is fed to a decoder 27 together with the image data valid signal LGATE and a decode switching signal output from the controller 23. The decoder 27 produces an output signal f. While the signal LGATE is in its high level, the decoder output f goes high if the counter output e is "0" or "63" in accordance with the decode switching signal, or goes low if otherwise. If desired, the decoder output f may be replaced with a decoder output f' which goes high only when the counter output e is "63" in accordance with the decode switching signal. The decoder output f or f' is input to the AND gate 29.

The AND gate 29 ANDs the halftone area signal output from the halftone area detector 60 and the output f or f' of the decoder 27 (representative of an interval between the LED chips 3). When both the halftone area signal and signal f or f' are in their high level, i.e., when the interval between the LED chips 3 is of halftone, the output i of the AND gate 29 goes high.

The selector 24 selects the image data D output from the read processing 20 if the AND output i is in its low level or selects the image data c output from the adder 25 if the signal i is in its high level, i.e., if the interval between the LED chips 3 is of halftone. The image data g output from the selector 24 is latched by the F/F 28 in response to the reference clock CLK and then input to the write processing 22 as image data h.

Another specific configuration of the data corrector 61 is shown in FIG. 20. FIG. 21 demonstrates a specific operation of the data corrector of FIG. 20. The data corrector 61 to be described corrects the image data in a different manner from the data corrector 61 described with reference to FIGS. 18 and 19, as follows. In the configuration shown in FIGS. 18 and 19, a preselected amount ("10" in the embodiment) is added to the image data D in order to increase the quantity of light to issue from the associated LEDs 2. However, when the density of the image data corresponding to the interval between nearby LED chips 3 is not higher than "20" or so, it increases only to about 30 when "10" is added. This is apt to bring about some degree of local omission although reducing it. In addition, when the density of the image data is as high as about "39", it is corrected more than necessary.

Figure 19A:
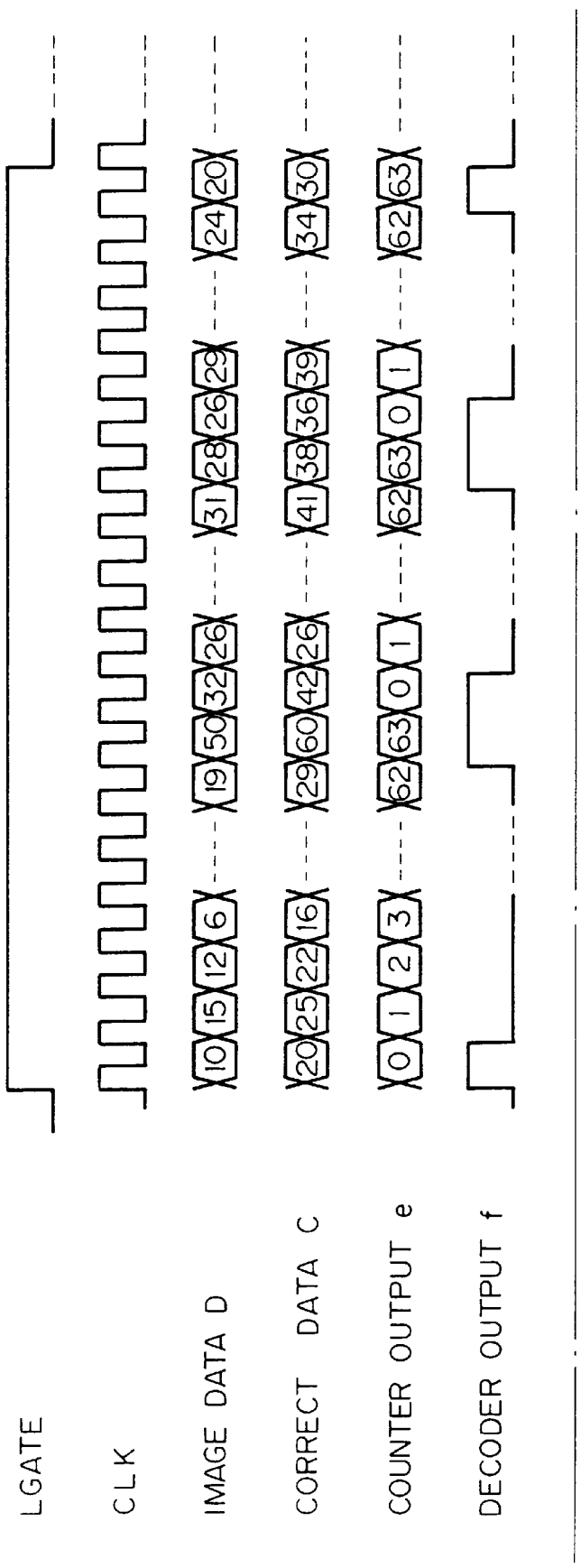
FIG. 19 is a timing chart showing a specific operation of the arrangement shown in FIG. 18.

The data corrector 61 shown in FIGS. 20 and 21 is capable of fully obviating the local omission by converting the image data to a preselected value which prevents the omission from occurring. Specifically, the controller 23 directly sets a correction value in the selector 24; the correction value is selected to be "40" capable of obviating the omission. As for the rest of the construction, the data corrector 61 is identical with the data corrector 61 shown in FIGS. 18 and 19. The selector 40 selects the correction value "40" fed from the controller 23 if the image data corresponding to the interval between nearby LED chips 3 is of halftone or selects the image data D output from the read processing 20 if otherwise. In FIGS. 19 and 21, numerals attached to the image data are representative of signal levels.

As stated above, in this embodiment, the data correction 21 also corrects the image data corresponding to the intervals between nearby LED chips 3, i.e., increases the values of such data by a preselected amount in order to increase the quantities of light to issue from the associated LEDs 2. This successfully obviates local omission of a halftone image in the form of white strips and thereby enhances image quality.

In summary, it will be seen that the present invention provides a writing device for an image forming apparatus which has various unprecedented advantages, as enumerated below.

(1) The writing devices determines whether or not an image at and around an interval between nearby light emitter chips of a light emitter array is of halftone. If the image is of halftone, the writing device corrects image data corresponding to the above interval in order to increase the quantity of light, thereby reducing or obviating the local omission of an output image and insuring a smooth output image.

(2) Only when the image data corresponding to the interval between the light emitter chips or lying in a preselected range including it are of halftone, the writing device corrects the image data. This prevents the image data not needing correction from being corrected and suffering from undesirable vertical stripes.

(3) The writing device corrects the image data either by increasing it by a preselected amount or by converting it to a preselected value capable of obviating the local omission. This is easy to practice and fully obviates the local omission.

Various modifications will become possible for those skilled in the art after receiving the teachings of the present disclosure without departing from the scope thereof.

What is claimed is:

1. A writing device for an image forming apparatus, comprising:

a light emitter array composing a plurality of light emitter chips arranged in an array and each having a plurality of light emitters also arranged in an array, for writing an image on a photoconductive element line by line by scanning said photoconductive element;

light emitter array control means for controllably driving each of said plurality of light emitters to output light in accordance with image data;

a halftone area detector configured to detect if image data at intervals between said light emitter chips is halftone image data; and data correcting means for correcting, in selected image data from among the image data input to said light emitter array control means, a quantity of light output by selected of the plurality of light emitters corresponding to the selected image data based on whether the selected of the plurality of light emitters are positioned at the intervals between said light emitter chips and based on said halftone area detector detecting that the image data at the intervals between said light emitter chips is of halftone image data.

2. A writing device as claimed in claim 1, wherein said intervals are intervals between adjacent of said plurality of light emitter chips.

3. A writing device as claimed in claim 1, wherein said data correcting means corrects the quantity of light output by the selected of the plurality of light emitters to increase the quantity of light to issue from the selected of the plurality of light emitters based on whether the selected of the plurality of light emitters are positioned at the intervals between said light emitter chips and based on said halftone area detector detecting that the image data at the intervals between said light emitter chips is of halftone image data.

4. A writing device as claimed in claim 1, wherein said data correcting means increases said quantity of light to issue from the selected of the plurality of light emitters based on said position of the selected of the plurality of light emitters corresponding to the intervals between said light emitter chips.

5. A writing device for an image forming apparatus, comprising:

a light emitter array composing a plurality of light emitter chips arranged in an array and each having a plurality of light emitters also arranged in an array, for writing an image on a photoconductive element line by line by scanning said photoconductive element;

light emitter array control means for controllably driving said plurality of light emitters of said light emitter array to output light in accordance with image data;

data correcting means for correcting, in selected image data from among the image data input to said light emitter array control means, a quantity of light output by selected of said plurality of light emitters corresponding to the selected image data based on whether the selected of the plurality of light emitters are positioned at the intervals between said light emitter chips; and data decision means for determining if image data at the intervals between said light emitter chips is halftone image data;

said data correcting means correcting the quantity of light output by the selected of the plurality of light emitters in accordance with a decision result output from said data decision means determining that the image data at the intervals between said light emitter chips is of halftone image data.

6. A writing device as claimed in claim 5, wherein said intervals are intervals between adjacent of said plurality of light emitter chips.

7. A writing device as claimed in claim 5, wherein when said data decision means determines that the selected image data is halftone image data, said data correcting means corrects said selected image data to increase the quantity of light output by the selected of the plurality of light emitters.

8. A writing device as claimed in claim 5, wherein said data correcting means, increases said quantity of light to issue from the selected of the plurality of light emitters based on whether the selected of the plurality of light emitters are positioned at intervals between said light emitter chips and based on said data decision means determining that the image data at the intervals between said light emitter chips is of halftone image data.

9. A writing device as claimed in claim 5, wherein said data correcting means converts the selected image data to a preselected value to thereby increase a quantity of light to issue from the selected of the plurality of light emitters.

* * * * *